United States Patent
Moreno et al.

(10) Patent No.: US 12,189,738 B2
(45) Date of Patent: Jan. 7, 2025

(54) FACE AUTHENTICATION EMBEDDING MIGRATION AND DRIFT-COMPENSATION

(71) Applicant: Google LLC, Mountain View, CA (US)

(72) Inventors: Michael Moreno, Santa Cruz, CA (US); Michael Williams, Sunnyvale, CA (US); Ji Soo Shin, Belmont, CA (US); Madhi Hamzeh, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 408 days.

(21) Appl. No.: 17/439,770

(22) PCT Filed: Sep. 9, 2019

(86) PCT No.: PCT/US2019/050245
§ 371 (c)(1),
(2) Date: Sep. 15, 2021

(87) PCT Pub. No.: WO2021/050042
PCT Pub. Date: Mar. 18, 2021

(65) Prior Publication Data
US 2022/0100831 A1    Mar. 31, 2022

(51) Int. Cl.
*H04L 29/06*    (2006.01)
*G06F 8/654*    (2018.01)
(Continued)

(52) U.S. Cl.
CPC .............. *G06F 21/32* (2013.01); *G06F 8/654* (2018.02); *G06F 9/44552* (2013.01);
(Continued)

(58) Field of Classification Search
CPC ..... H04W 12/65; H04W 12/08; H04W 12/06; H04L 63/0861; H04L 63/102;
(Continued)

(56) References Cited

U.S. PATENT DOCUMENTS 7,099,056 B1    8/2006    Kindt
7,315,631 B1    1/2008    Corcoran et al.
(Continued)

FOREIGN PATENT DOCUMENTS

CN    101202841    6/2008
CN    101782928 A    7/2010
(Continued)

OTHER PUBLICATIONS

"A Review of Multimodal Facial Biometric Authentication Methods in Mobile Devices and their Application in Head Mounted Displays", 2018 IEEE SmartWorld, Ubiquitous Intelligence & Computing, Advanced & Trusted Computing, Scalable Computing & Communications, Cloud & Big Data Computing, Internet of People and Smart City Innovations, 2018, 8 pages.
(Continued)

*Primary Examiner* — Wasika Nipa
*Assistant Examiner* — Leynna Truvan
(74) *Attorney, Agent, or Firm* — Colby Nipper PLLC

(57) ABSTRACT

This document describes techniques and systems that enable face authentication embedding migration and drift-compensation. The techniques and systems include a user device that is updated to include both a current version of firmware and an updated version of the firmware. Then, an indication of a face-authentication attempt is received along with image data associated with a user's face. After successful authentication, using the current version of firmware on the image data, the user device uses the updated version of the firmware on the same image data to generate a new embedding. The new embedding is stored as part of a migration profile for the user. Additional new embeddings are collected over a series of subsequent face-authentication attempts until a complete set of new embeddings is stored for the migration profile. Then, the old profile is deleted and
(Continued)

the migration profile becomes the enrollment profile used for face authentication.

20 Claims, 11 Drawing Sheets

(51) Int. Cl.
| | | |
|---|---|---|
| *G06F 9/445* | (2018.01) | |
| *G06F 21/32* | (2013.01) | |
| *G06F 21/57* | (2013.01) | |
| *G06N 20/20* | (2019.01) | |
| *G06F 16/21* | (2019.01) | |

(52) U.S. Cl.
CPC ........... *G06F 21/572* (2013.01); *G06N 20/20* (2019.01); *G06F 16/21* (2019.01); *G06F 2221/034* (2013.01)

(58) Field of Classification Search
CPC ..... H04L 9/3231; H04L 12/243; G06F 21/32; G06F 8/654; G06F 9/44552; G06F 21/572; G06F 2221/034; G06F 21/30; G06F 21/31; G06F 3/123; G06F 21/50; G06F 8/71; G06F 21/57; G06F 40/197; G06N 20/20; G06Q 20/40145; G06Q 20/3674; G07C 9/25; G07C 9/37; H04N 1/442; H04N 21/4415; H04N 21/25875; H04N 2201/3239; G01C 21/387; G06K 9/00268; G06K 9/00362; G06T 2207/30201
See application file for complete search history.

(56) References Cited

U.S. PATENT DOCUMENTS

| | | | |
|---|---|---|---|
| 7,542,628 | B2 | 6/2009 | Lolacono et al. |
| 8,330,831 | B2 | 12/2012 | Steinberg et al. |
| 8,483,479 | B2 | 7/2013 | Kunkel et al. |
| 8,798,378 | B1 | 8/2014 | Babenko et al. |
| 8,890,975 | B2 | 11/2014 | Baba et al. |
| 8,982,238 | B2 | 3/2015 | Liu et al. |
| 9,253,412 | B2 | 2/2016 | Lee |
| 9,286,509 | B1 | 3/2016 | Rodriguez |
| 9,491,452 | B2 | 11/2016 | Meloun et al. |
| 9,609,197 | B1 | 3/2017 | Stepanenko |
| 9,619,633 | B1 | 4/2017 | Mortensen |
| 9,686,475 | B2 | 6/2017 | Neglur |
| 9,774,798 | B1 | 9/2017 | Evans, V et al. |
| 10,015,408 | B2 | 7/2018 | Shabtay et al. |
| 10,521,952 | B2 | 12/2019 | Ackerson et al. |
| 11,257,226 | B1 | 2/2022 | Soth et al. |
| 11,352,812 | B2 | 6/2022 | Johnson |
| 11,687,635 | B2 | 6/2023 | Kowdle et al. |
| 11,734,820 | B2 | 8/2023 | Oosake |
| 12,046,072 | B2 | 7/2024 | He et al. |
| 2003/0068100 | A1 | 4/2003 | Covell et al. |
| 2003/0103652 | A1 | 6/2003 | Lee et al. |
| 2005/0099494 | A1 | 5/2005 | Deng et al. |
| 2005/0147278 | A1 | 7/2005 | Rui et al. |
| 2005/0265626 | A1 | 12/2005 | Endo et al. |
| 2006/0104488 | A1 | 5/2006 | Bazakos et al. |
| 2007/0025714 | A1 | 2/2007 | Shiraki |
| 2007/0052839 | A1 | 3/2007 | Kong et al. |
| 2007/0216777 | A1 | 9/2007 | Quan et al. |
| 2009/0207266 | A1 | 8/2009 | Yoda |
| 2009/0303342 | A1 | 12/2009 | Corcoran et al. |
| 2009/0303343 | A1 | 12/2009 | Drimbarean et al. |
| 2010/0048242 | A1 | 2/2010 | Rhoads et al. |
| 2011/0034176 | A1 | 2/2011 | Lord et al. |
| 2011/0090303 | A1 | 4/2011 | Wu et al. |
| 2011/0143811 | A1 | 6/2011 | Rodriquez |
| 2011/0212717 | A1 | 9/2011 | Rhoads et al. |
| 2011/0261217 | A1 | 10/2011 | Muukki et al. |
| 2012/0002074 | A1 | 1/2012 | Baba et al. |
| 2012/0050570 | A1 | 3/2012 | Jasinski et al. |
| 2012/0051635 | A1 | 3/2012 | Kunkel et al. |
| 2012/0154579 | A1 | 6/2012 | Hampapur et al. |
| 2012/0162478 | A1 | 6/2012 | Lee |
| 2012/0307096 | A1 | 12/2012 | Ford et al. |
| 2013/0147923 | A1 | 6/2013 | Zhou et al. |
| 2013/0177203 | A1 | 7/2013 | Koo et al. |
| 2013/0242129 | A1 | 9/2013 | Harmelling et al. |
| 2013/0342731 | A1 | 12/2013 | Lee et al. |
| 2014/0009639 | A1 | 1/2014 | Lee |
| 2014/0080428 | A1 | 3/2014 | Rhoads et al. |
| 2015/0033305 | A1* | 1/2015 | Shear ................. G06F 21/6218 726/11 |
| 2015/0156388 | A1 | 6/2015 | Neglur |
| 2015/0348580 | A1 | 12/2015 | Van Hoff et al. |
| 2016/0112637 | A1 | 4/2016 | Aroia et al. |
| 2016/0163029 | A1 | 6/2016 | Gibbon et al. |
| 2016/0234023 | A1 | 8/2016 | Mozer et al. |
| 2016/0248979 | A1 | 8/2016 | Israel et al. |
| 2016/0283789 | A1 | 9/2016 | Slaby et al. |
| 2016/0309065 | A1 | 10/2016 | Karafin et al. |
| 2016/0337570 | A1 | 11/2016 | Tan et al. |
| 2017/0053167 | A1 | 2/2017 | Ren et al. |
| 2017/0116932 | A1 | 4/2017 | Musgrave et al. |
| 2017/0213112 | A1 | 7/2017 | Sachs et al. |
| 2017/0351932 | A1 | 12/2017 | Uliyar et al. |
| 2018/0181737 | A1 | 6/2018 | Tussy |
| 2018/0249142 | A1 | 8/2018 | Hicks et al. |
| 2018/0336399 | A1 | 11/2018 | Gernoth et al. |
| 2018/0367681 | A1 | 12/2018 | Xu et al. |
| 2019/0042718 | A1 | 2/2019 | Prakash et al. |
| 2019/0042835 | A1 | 2/2019 | Mostafa et al. |
| 2019/0130166 | A1 | 5/2019 | Wang |
| 2019/0130630 | A1 | 5/2019 | Ackerson et al. |
| 2019/0138793 | A1 | 5/2019 | Rodriguez |
| 2019/0171908 | A1 | 6/2019 | Salavon |
| 2019/0259360 | A1 | 8/2019 | Yoelin |
| 2020/0053262 | A1 | 2/2020 | Wexler et al. |
| 2020/0105291 | A1 | 4/2020 | Sheaffer et al. |
| 2020/0128203 | A1 | 4/2020 | Hirono et al. |
| 2020/0151964 | A1 | 5/2020 | Chen et al. |
| 2020/0184278 | A1 | 6/2020 | Zadeh et al. |
| 2020/0225673 | A1 | 7/2020 | Ebrahimi et al. |
| 2020/0236466 | A1 | 7/2020 | Zhao et al. |
| 2020/0320297 | A1 | 10/2020 | Ahn et al. |
| 2020/0349249 | A1 | 11/2020 | Weston |
| 2020/0349345 | A1 | 11/2020 | Hodge et al. |
| 2020/0349376 | A1 | 11/2020 | Raveendran |
| 2021/0001862 | A1 | 1/2021 | Senechal et al. |
| 2021/0248782 | A1 | 8/2021 | Chang et al. |
| 2022/0121884 | A1 | 4/2022 | Zadeh et al. |
| 2022/0172511 | A1 | 6/2022 | He et al. |
| 2022/0191374 | A1 | 6/2022 | Kowdle et al. |
| 2022/0319219 | A1 | 10/2022 | Tsibulevskiy et al. |
| 2022/0382840 | A1 | 12/2022 | Weston et al. |

FOREIGN PATENT DOCUMENTS

| | | |
|---|---|---|
| CN | 103702015 | 4/2014 |
| CN | 105432079 A | 3/2016 |
| CN | 106446873 | 2/2017 |
| CN | 107302663 | 10/2017 |
| CN | 107734129 | 2/2018 |
| CN | 108780477 | 11/2018 |
| CN | 108965721 A | 12/2018 |
| CN | 109145653 | 1/2019 |
| CN | 109325327 | 2/2019 |
| CN | 109325328 A | 2/2019 |
| CN | 109325393 A | 2/2019 |
| CN | 109587303 | 4/2019 |
| CN | 109697419 A | 4/2019 |
| CN | 110268445 A | 9/2019 |
| CN | 209419666 U | 9/2019 |
| CN | 110298874 A | 10/2019 |
| CN | 110312056 A | 10/2019 |
| CN | 111738230 | 10/2020 |
| CN | 107636685 B | 2/2022 |

(56) References Cited

FOREIGN PATENT DOCUMENTS

| | | |
|---|---|---|
| JP | 2013152643 | 8/2013 |
| WO | 2005096213 | 10/2005 |
| WO | 2018005073 | 1/2018 |
| WO | 2018188535 | 10/2018 |
| WO | 2018198690 | 11/2018 |
| WO | 2019027503 | 2/2019 |
| WO | 2021050042 | 3/2021 |
| WO | 2021061112 | 4/2021 |
| WO | 2021066839 | 4/2021 |
| WO | 2021071497 | 4/2021 |

OTHER PUBLICATIONS

"AudioCapture-Premium Audio Experience for Your Video Recordings", Retrieved at: https://product.goodix.com/en/product/audioa_capture—on Mar. 8, 2021, 2 pages.

"Foreign Office Action", EP Application No. 19797409.0, Jul. 16, 2021, 4 pages.

"International Search Report and Written Opinion", Application No. PCT/US2019/052860, Jul. 20, 2020, 27 pages.

"International Search Report and Written Opinion", PCT Application No. PCT/US2019/054712, Jan. 10, 2020, 15 pages.

"International Search Report and Written Opinion", PCT Application No. PCT/US2019/050245, May 12, 2020, 42 pages.

"International Search Report and Written Opinion", PCT Application No. PCT/US2019/055669, May 28, 2020, 20 pages.

"Invitation to Pay Additional Fees", PCT Application No. PCT/US2019/052860, Jun. 2, 2020, 12 pages.

"Nokia OZO Audio", OZO.Nokia.com—Retrieved on Feb. 10, 2021, 2020, 16 pages.

"Notice of Allowance", U.S. Appl. No. 16/956,730, filed Jul. 9, 2021, 10 pages.

"PL-D Camera Synchronization Methods", Retrieved from the internet at https://support.pixelink.com/support/solutions/articles/3000085024-pl-d-camera-synchronization-methods, Aug. 1, 2019, 9 pages.

Chang, et al., "Low-light Image Restoration with Short-and-long-exposure Raw Pairs", Jul. 1, 2020, 12 pages.

Chang, "Measuring Stereo Camera Alignment Using Depth Map Smoothness", Technical Disclosure Commons; Retrieved from https://www.tdcommons.org/dpubs_series/2580, Oct. 17, 2019, 9 pages.

Chen, "Enhancing Image Quality of Photographs Taken by Portable Devices by Matching Images to High Quality Reference Images Using Machine Learning and Camera Orientation and Other Image Metadata", Technical Disclosure Commons; Retrieved from https://www.tdcommons.org/dpubs_series/2717, Nov. 25, 2019, 14 pages.

Cho, "Motion Blur Removal from Photographs", Massachusetts Institute of Technology, Sep. 2010, 143 pages.

Fried, et al., "Perspective-Aware Manipulation of Portrait Photos", SIGGRAPH '16 Technical Paper, Jul. 24-28, 2016, Anaheim, CA, 10 pages.

Gao, et al., "Camera Sensor Exposure Control During Camera Launch", Nov. 24, 2020, 7 pages.

Gao, et al., "Scene Metering and Exposure Control for Enhancing High Dynamic Range Imaging", Technical Disclosure Commons; Retrieved from https://www.tdcommons.org/dpubs_series/3092, Apr. 1, 2020, 12 pages.

Hahne, "Real-Time Depth Imaging", Retrieved from https://d-nb.info/1023762218/34, May 3, 2012, 108 pages.

Hong, et al., "Image Deblurring According to Facially Recognized Locations Within the Image", Technical Disclosure Commons, https://www.tdcommons.org/dpubs_series/4193, Mar. 26, 2021, 9 pages.

Hong, et al., "Method of Capturing a Video and a Set of Selected High-Quality Images During Camera Shutter Long- Press", Technical Disclosure Commons; Retrieved from https://www.tdcommons.org/dpubs_series/2757, Dec. 12, 2019, 10 pages.

Hong, et al., "Predictive Modeling Techniques for Adaptive Face Retouching", https://www.tdcommons.org/dpubs_series/4208, Apr. 5, 2021, 9 pages.

Jackson, "The Creative and Technical Differences Between Full Frame and S-35", Accessed from: https://vmi.tv/training/useful-stuff/differences-between-full-frame-and-s-35, Feb. 2020, 19 pages.

Jain, et al., "On Detecting GANs and Retouching Based Synthetic Alterations", Jan. 26, 2019, 7 pages.

Khoshelham, et al., "Accuracy and Resolution of Kinect Depth Data for Indoor Mapping Applications", Retrieved from https://www.researchgate.net/publication/221967616_Accuracy_and_Resolution_of_Kinect_Depth_Data_for_Indoor_Mapping_Applications, Feb. 1, 2012, 18 pages.

Li, "Scene-Aware Audio for 360° Videos", May 12, 2018, 12 pages.

Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.

Moraldo, "Virtual Camera Image Processing", Technical Disclosure Commons; Retrieved from https://www.dcommons.org/dpubs_series/3072, Mar. 30, 2020, 10 pages.

Mustaniemi, et al., "LSD—Joint Denoising and Deblurring of Short and Long Exposure Images with CNNs", Sep. 1, 2020, 21 pages.

Portmann, et al., "Detection of Automated Facial Beautification by a Camera Application by Comparing a Face to a Rearranged Face", Technical Disclosure Commons, Retrieved from https://www.tdcommons.org/dpubs_series/2943, Feb. 9, 2020, 11 pages.

Shih, et al., "Techniques for Deblurring Faces in Images by Utilizing Multi- Camera Fusion", Technical Disclosure Commons—https://www.tdcommons.org/dpubs_series/4274, May 5, 2021, 9 pages.

Talvala, et al., "Techniques and Apparatuses for Variable-Display Devices to Capture Screen-Fitting Images with a Maximized Field of View", Technical Disclosure Commons; Retrieved from https://www.tdcommons.org/dpubs_series/3388, Jun. 29, 2020, 8 pages.

Tillman, "What is Apple Face ID and How Does it Work?", Retrieved from the internet at https://www.pocket-lint.com/phones/news/apple/142207-what-is-apple-face-id-and-how-does-it-work on May 13, 2020, Sep. 18, 2019, 10 pages.

Xompero, et al., "Multi-camera Matching of Spatio-Temporal Binary Features", 2018 21st International Conference on Information Fusion (FUSION), 2018, 8 pages.

Yang, et al., "Improved Object Detection in an Image by Correcting Regions with Distortion", Technical Disclosure Commons; Retrieved from https://www.tdcommons.org/dpubs_series/3090, Apr. 1, 2020, 8 pages.

Yang, et al., "Object Detection and Tracking with Post-Merge Motion Estimation", Technical Disclosure Commons, https://www.tdcommons.org/dpubs_series_4353, Jun. 8, 2021, 11 pages.

Yang, et al., "Using Image-Processing Settings to Determine an Optimal Operating Point for Object Detection on Imaging Devices", Technical Disclosure Commons; Retrieved from https://www.tdcommons.org/dpubs_series/2985, Mar. 4, 2020, 10 pages.

Yuan, et al., "Image Deblurring with Blurred/Noisy Image Pairs", Jul. 29, 2007, 10 pages.

"Foreign Office Action", CN Application No. 201980093777.8, Oct. 19, 2022, 20 pages.

"Foreign Office Action", CN Application No. 201980093736.9, 20 pages.

"Non-Final Office Action", U.S. Appl. No. 17/439,762, filed Nov. 29, 2022, 7 pages.

"Non-Final Office Action", U.S. Appl. No. 17/437,395, filed May 2, 2023, 16 pages.

"Notice of Allowance", U.S. Appl. No. 17/439,762, filed Mar. 8, 2023, 7 pages.

"International Preliminary Report on Patentability", Application No. PCT/US2019/050245, Mar. 9, 2022, 10 pages.

"International Preliminary Report on Patentability", Application No. PCT/US2019/052860, Mar. 15, 2022, 19 pages.

"International Preliminary Report on Patentability", Application No. PCT/US2019/054712, Apr. 5, 2022, 10 pages.

"Preliminary Report on Patentability", Application No. PCT/US2019/055669, Apr. 12, 2022, 13 pages.

(56) References Cited

OTHER PUBLICATIONS

"Reinforcement Learning—Wikipedia", Retrieved from: https://en.wikipedia.org/wiki/Reinforcement_learning—on May 11, 2022, 16 pages.
Gordon, "How to Use HDR Mode When Taking Photos", Dec. 17, 2020, 13 pages.
Hasinoff, et al., "Burst photography for high dynamic range and low-light imaging on mobile cameras", Nov. 2016, 12 pages.
Kains, et al., "Astrophotography with Night Sight on Pixel Phones", https://ai.googleblog.com/2019/11/astrophotography-with-night sight-on.html, Nov. 26, 2019, 8 pages.
"Final Office Action", U.S. Appl. No. 17/437,395, filed Sep. 7, 2023, 18 pages.
"Foreign Office Action", EP Application No. 19773633.3, Jun. 13, 2023, 8 pages.
"Advisory Action", U.S. Appl. No. 17/437,395, filed Dec. 12, 2023, 3 pages.
"Foreign Office Action", CN Application No. 201980093725.0, Feb. 8, 2024, 15 pages.
"Notice of Allowance", U.S. Appl. No. 17/437,395, filed Mar. 13, 2024, 9 pages.
"Foreign Office Action", CN Application No. 201980008571.0, May 31, 2024, 11 pages.

\* cited by examiner

FACE AUTHENTICATION EMBEDDING MIGRATION AND DRIFT-COMPENSATION

CROSS-REFERENCE TO RELATED APPLICATION(S)

This application is a national stage entry of International Application No. PCT/US2019/050245, filed Sep. 9, 2019, the disclosure which is incorporated herein by reference in its entirety.

BACKGROUND

Computer security using face authentication solutions provides a convenient and simple way for users to securely access accounts or sign transactions, which enhances the user experience. A user device may implement face authentication using a machine-learned model trained using machine-learning techniques to perform face authentication. The machine-learned model can run as part of firmware executing on the user device. During face authentication, the machine-learned model executes within in a secure context, and as part of firmware, to calculate an embedding from infrared images and stores that embedding for comparison. An embedding is an n-dimensional vector that represents features of a person's face. When a user initially enrolls or sets up face authentication on the user device, the user device generates and stores a set of embeddings representing the user's face. This set of embeddings is used for subsequent authentication of the user to unlock the user device.

Over time, updates of the firmware and the machine-learned model defined by the firmware may be developed for increased security and quality, such as better spoof rejection, better facial recognition, and so on. However, different versions of the machine-learned model can produce embeddings that are not backward compatible with older versions of the machine-learned model that execute within prior versions of the firmware. In addition, gradual changes to the user's face may occur over time, such as beard growth, aging, new glasses, etc. These changes can cause the success rate of the face authentication to decrease over time because the embeddings generated during successive face-authentication attempts may drift away from the stored embeddings that were created at enrollment. Because of this embedding incompatibility, either triggered from an update to the machine-learned model or due to embedding-drift, the user is typically forced to re-enroll for face authentication as if it were the first time enrolling with face authentication on the user device. Forcing the user to re-enroll to compensate for embedding drift or otherwise incompatible embeddings is inefficient and significantly diminishes the user experience.

SUMMARY

This document describes techniques and systems that enable face authentication embedding migration and drift-compensation. A user device is updated to host both a current version of firmware including a current face-authentication model and an updated version of the firmware including an updated version of the face-authentication model. During an authentication attempt, the user device loads both versions of the face-authentication model for execution in the same secure session. Embeddings are generated side-by-side by the two different face-authentication model versions using the same input images during authentication. The current face-authentication model is used to generate embeddings for validation against a stored set of enrolled embeddings for face authentication, while the updated face-authentication model is used to generate new embeddings for migration to an updated set of embeddings. The embeddings generated by the updated face-authentication model are stored in secure storage until a complete set has been collected. In response to obtaining a complete set of new embeddings, the user device may switch to the updated face-authentication model and uses the new set of embeddings for subsequent authentication attempts. Further, the original set of enrolled embeddings are deleted. A migration may not be necessary for every face-authentication model update, but may be necessary for updates that do not have compatible embeddings.

This summary is provided to introduce simplified concepts concerning face authentication embedding migration and drift-compensation, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of face authentication embedding migration and drift-compensation are described in this document with reference to the following drawings. The same numbers are used throughout the drawings to reference like features and components.

DETAILED DESCRIPTION

Overview

Figure 1:
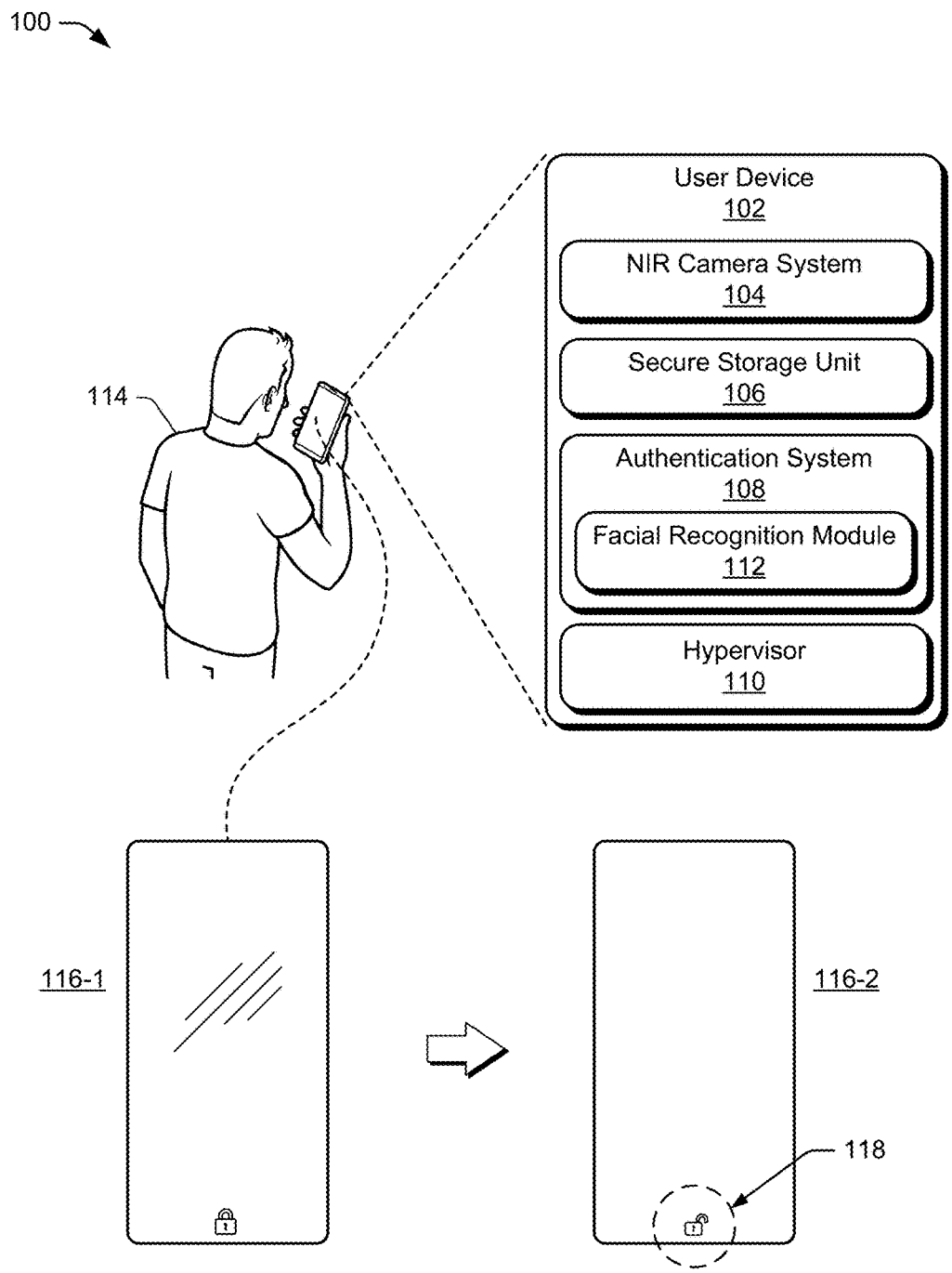
FIG. 1 illustrates an example environment in which techniques for face authentication embedding drift-compensation and migration can be implemented.

This document describes techniques and systems that enable face authentication embedding migration and drift-compensation. Updated versions of firmware including an updated face-authentication model used for face authentication may not be backwards compatible with older versions of the firmware, which dramatically reduces code complexity and code size of the updated versions of the firmware. Consequently, each time a user updates their computing device, the user may be forced to re-enroll for face authentication by repeating a setup process to create a new user profile using the updated firmware. To avoid this inefficient process, techniques and systems are described to load two versions of firmware in the same secure session, executing a first, current firmware for authentication and a second, updated firmware for embedding migration. After the user is authenticated using the current firmware, the user device creates a new user profile by executing the updated firmware as a background task, over a period of time and without requiring the user to re-enroll. The user device may then automatically switch to executing the updated firmware in place of the old version of the firmware for authentication when the new user profile is sufficiently complete. Thus, the embeddings used for face authentication can be updated seamlessly and without user supervision, over a period of time (e.g., one week) by migrating the embeddings to a new, updated profile while maintaining the entire secure workflow and without leaking any image or embedding information outside of the secure pipeline. Further, because the updated embeddings are generated after the user is authenticated, the migration of the updated embeddings does not provide user visible latency. In this way, the techniques described herein provide a more efficient process of updating a user-profile during an authenticating process, avoiding the need for a separate re-enrollment procedure. Aspects can thus provide an improved process of updating a user-profile, e.g., for a new firmware or for drift-compensation. Furthermore, aspects may provide a more accurate user profile, by allowing embeddings to be captured over a period of time in varying conditions.

In aspects, a method of migrating face authentication profile data in a user device performed by the user device is described. The method includes updating the user device to include both a current version of firmware and an updated version of the firmware. The method also includes, subsequent to the updating, receiving an indication of a face-authentication attempt and image data associated with a user's face. In addition, the method includes loading both the current version of the firmware and the updated version of the firmware in a same secure session, and executing the current version of the firmware to generate comparison data using the captured image data. Further, the method includes authenticating the user to unlock the user device based on the comparison data substantially matching a first profile, the first profile based on a set of enrolled embeddings that were previously generated using the current version of the firmware on previously captured image data of the user's face. Also, the method includes, responsive to authenticating the user to unlock the user device, generating one or more new embeddings by executing the updated version of the firmware and processing the captured image data. Additionally, the method includes storing the one or more new embeddings at a separate location from the set of enrolled embeddings, the one or more new embeddings stored as part of a second profile for the user.

In aspects, a method of migrating face authentication profile data for drift-compensation in a user device is described. The method includes receiving, by a hypervisor of the user device, a profile identity and image data associated with a face-authentication attempt of a user's face. In addition, the method includes specifying, by the hypervisor, the profile identity and an optional migration profile. Also, the method includes generating, by a processor unit, a new embedding using the image data. Further, the method includes authenticating the user to unlock the user device based on the new embedding substantially matching an enrolled embedding from a set of enrolled embeddings corresponding to the profile identity. The method also includes determining that the new embedding differs from the enrolled embedding by an amount that is within a range bounded by first and second threshold differences, the first threshold difference representing a maximum difference that is acceptable to be considered a match, the second threshold difference being less than the first threshold difference and representing a minimum difference that is acceptable to be considered drift. Additionally, the method includes, based on the determining, storing the new embedding as a drifted embedding in a migration region corresponding to the migration profile.

These are but a few examples of how the described techniques and devices may be used to enable face authentication embedding migration and drift-compensation. Other examples and implementations are described throughout this document. The document now turns to an example operating environment, after which example devices, methods, and systems are described.

Operating Environment

FIG. 1 illustrates an example environment 100 in which techniques enabling face authentication embedding migration and drift-compensation can be implemented. The example environment 100 includes a user device 102 (e.g., electronic device), which includes, or is associated with, a near-infrared (NIR) camera system 104, a secure storage unit 106 (e.g., security chip), an authentication system 108, and a hypervisor 110. As further described below, the authentication system 108 is configured to implement a facial recognition module 112. For security, image data captured by the NIR camera system 104 are passed to the authentication system 108 via the hypervisor 110. Near infrared (NIR) light generally refers to light within a range of wavelengths between approximately 750 nm and 2,500 nm, and is invisible to the human eye. The facial recognition module 112 is also configured to use a neural network (e.g., convolutional neural network) or other type of machine-learned model, trained using machine learning techniques, to generate one or more embeddings from the captured image data.

If the image data is captured during an enrollment process of face authentication, the facial recognition module 112 stores the embeddings generated by the machine-learned model in the secure storage unit 106. If, however, the user device 102 is in a locked state 116-1 and a user 114 is attempting to unlock the user device 102 subsequent to enrollment, the facial recognition module 112 compares the embedding to a set of embeddings stored in the secure storage unit 106. Based on the comparison, the machine-learned model of the facial recognition module 112 either rejects the authentication or authenticates the user 114 to unlock the user device 102 to an unlocked state 116-2. If the authentication is rejected, the user device 102 remains in the locked state 116-1. If the user 114 is authenticated, the user device 102 transitions to the unlocked state 116-2, as represented in FIG. 1 by an unlock icon 118. In this way, the user 114 essentially uses the user device 102 to take a "selfie" to unlock the user device 102, without being required to provide any additional input.

Throughout this disclosure examples are described where a computing system (e.g., the user device 102, a client device, a server device, a computer, or other type of computing system) may analyze information (e.g., radar, inertial, and facial-recognition sensor data) associated with a user, such as the just-mentioned facial features. The computing system, however, can be configured to only use the information after the computing system receives explicit permission from the user of the computing system to use the data. For example, in situations where the user device 102 analyzes sensor data for facial features to authenticate the user 114, the sensor data is contained in a secure pipeline, which includes a secure camera pipeline, the hypervisor 110, and an image processor (described below), and cannot be removed from this secure pipeline. Likewise, the embeddings cannot leave this secure pipeline but are stored in the secure storage unit 106 and cannot be retrieved for use outside of the secure storage unit 106. The individual users may have constant control over what programs can or cannot do with sensor data. In addition, information collected may be pre-treated in one or more ways before it is transferred, stored, or otherwise used, so that personally-identifiable information is removed. For example, before the user device 102 shares sensor data with another device (e.g., to train a model executing at another device), the user device 102 may pre-treat the sensor data to ensure that any user-identifying information or device-identifying information embedded in the data is removed. Thus, the user may have control over whether information is collected about the user and the user's device, and how such information, if collected, may be used by the computing device and/or a remote computing system.

Figure 2:
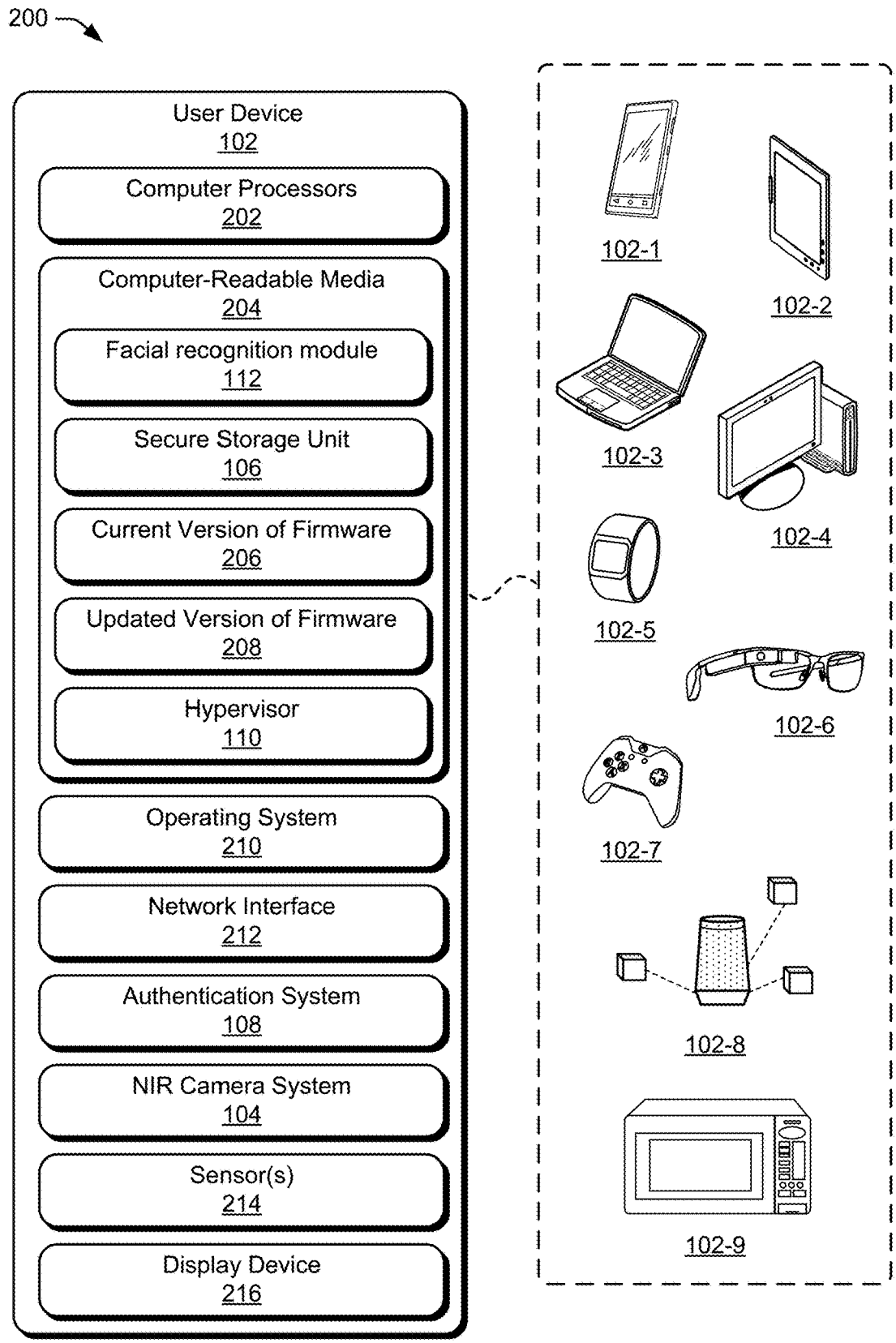
FIG. 2 illustrates an example implementation of the user device of FIG. 1 that includes a face authentication system.

In more detail, consider FIG. 2, which illustrates an example implementation 200 of the user device 102 that can implement face authentication embedding migration and drift-compensation. The user device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The user device 102 can also include other devices, such as televisions, entertainment systems, audio systems, automobiles, drones, track pads, drawing pads, netbooks, e-readers, home security systems, and other home appliances. Note that the user device 102 can be wearable, non-wearable but mobile, or relatively immobile (e.g., desktops and appliances).

The user device 102 also includes one or more computer processors 202 and one or more computer-readable media 204, which includes memory media and storage media. Applications and/or an operating system 210 implemented as computer-readable instructions on the computer-readable media 204 can be executed by the computer processors 202 to provide some or all of the functionalities described herein. For example, the computer-readable media 204 can include the facial recognition module 112 along with multiple versions of firmware, such as a current version of firmware 206 and an updated version of firmware 208, managed by a hypervisor 110 of the operating system 210 executing on the user device 102. Each version of firmware includes a machine-learned model trained to generate embeddings from captured image data. The facial recognition module 112 can call on the different machine-learned models depending on which version of firmware is loaded by the hypervisor 110. The computer-readable media 204 includes the secure storage unit 106, which is not accessible by processes or applications in the user space.

The secure storage unit 106 is configured to store security data (e.g., user credentials) used for privacy controls, such as controls to unlock the user device 102 (including face authentication data, password/passcode information, fingerprint data, and so on). Although this security data can be used to authenticate the user 114 to unlock the user device 102 using face authentication, password/passcode authentication, fingerprint authentication, and so on, personal information about the user 114 cannot be obtained by the security data. Specifically, the user 114 cannot be identified by the security data. Rather, the security data is used to simply determine whether data received from a user attempting to unlock the phone matches stored profile data representing a user that set up the security on the user device 102. In an example, the embeddings generated from captured images of the user's face are numerical vector representations of facial features of the user 114. These embeddings are simply used for comparison to new embeddings, generated from images captured during a face-authentication attempt, to locate a match.

The user device 102 may also include a network interface 212. The user device 102 can use the network interface 212 for communicating data over wired, wireless, or optical networks. By way of example and not limitation, the network interface 212 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the authentication system 108 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. As described in further detail below, the authentication system 108 can, in a secure mode, compare authentication data received from the user 114 to the security data stored in the secure storage unit 106 for authenticating the user 114 to unlock the user device 102. In some aspects, the authentication system 108 generates the authentication data using image data obtained from the NIR camera system 104 and provides the authentication data to the secure storage unit 106 to enable the secure storage unit 106 to compare the authentication data to the stored security data and determine if there is a match.

The NIR camera system 104 is implemented to capture NIR image data usable to generate a three-dimensional depth map of an object, such as a user's face. Further details are described with respect to FIG. 3 below.

The user device 102 can also include one or more sensors 214. The one or more sensors 214 can include any of a variety of sensors, such as an audio sensor (e.g., a microphone), a touch-input sensor (e.g., a touchscreen), an image-capture device (e.g., a camera or video-camera), proximity sensors (e.g., capacitive sensors), or ambient light sensors (e.g., a photodetector). In at least some implementations, the user device 102 can include a radar system (not shown) to detect a proximity of the user 114 to the user device 102, and based on that proximity, initiate one or more components and/or functions, such as firing up the NIR camera system 104 and the authentication system 108 to initiate an attempt for face authentication.

The user device 102 can also include a display device 216. The display device 216 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth.

Figure 3:
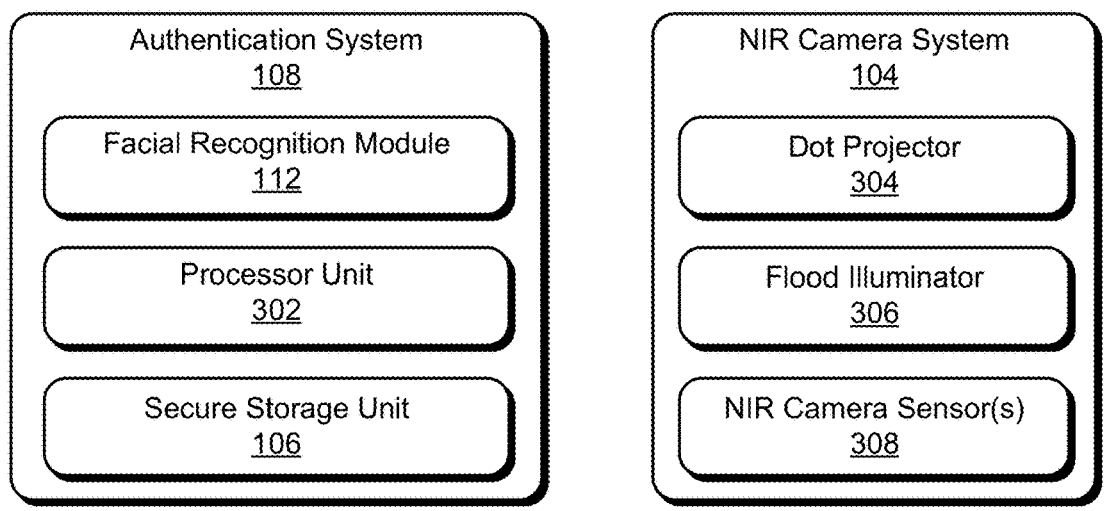
FIG. 3 illustrates an example authentication system and near infrared camera system as part of a user device.

FIG. 3 illustrates an example implementation 300 of the authentication system 108 and NIR camera system 104 of FIGS. 1 and 2 in further detail. The authentication system 108 includes, or communicates with, the facial recognition module 112, a processor unit 302, and a secure storage unit 106.

The processor unit 302 is configured with the functionalities of both an image processing unit (IPU) and a tensor processing unit (TPU). Specifically, the processor unit 302 is configured for image processing of digital image input as well as for neural network machine learning. Essentially, the processor unit 302 is a combination of an IPU and an artificial-intelligence accelerator application-specific integrated circuit (ASIC) (e.g., the TPU). The processor unit 302 specifically is configured to generate embeddings for face authentication by using images of a person's face captured in the near-infrared spectrum as input to a machine learned model.

The NIR camera system 104 includes a dot projector 304, a flood illuminator 306, and one or more NIR camera sensors 308. The flood illuminator 306 illuminates the subject with NIR light and the NIR camera sensors 308 each capture an image of the subject based on the NIR light. The dot projector 304 projects thousands of NIR dots onto the subject and the NIR camera sensors 308 each capture an image of the resulting dot pattern. The processor unit 302 of the authentication system 108 reads the image and the dot pattern and generates a three-dimensional facial map. When multiple (e.g., two) NIR cameras are used, the processor unit 302 calculates a difference between matching points on the different captured images, which provides a depth for respective pixels and enhances the accuracy of the three-dimensional facial map.

These and other capabilities and configurations, as well as ways in which entities of FIGS. 1 to 3 act and interact, are set forth in greater detail below. These entities may be further divided, combined, and so on. The environment 100 of FIG. 1, the implementations 200 and 300 of FIGS. 2 and 3, and the detailed illustrations of FIG. 4 through FIG. 11 illustrate some of many possible environments and devices capable of employing the described techniques.

Figure 4:
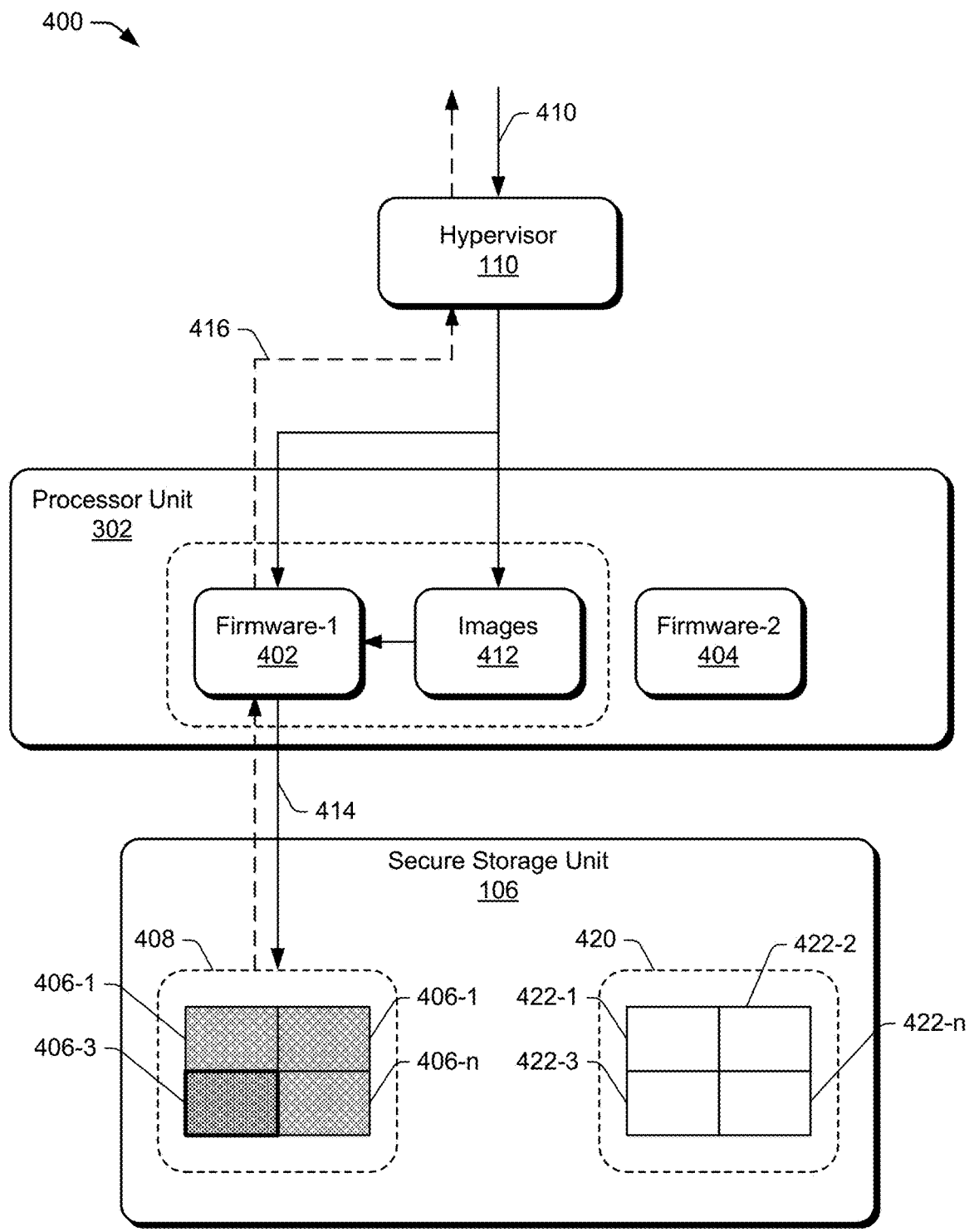
FIGS. 4 to 6 illustrate an example implementations of face authentication embedding migration and drift-compensation employed by a user device.
Figure 5:
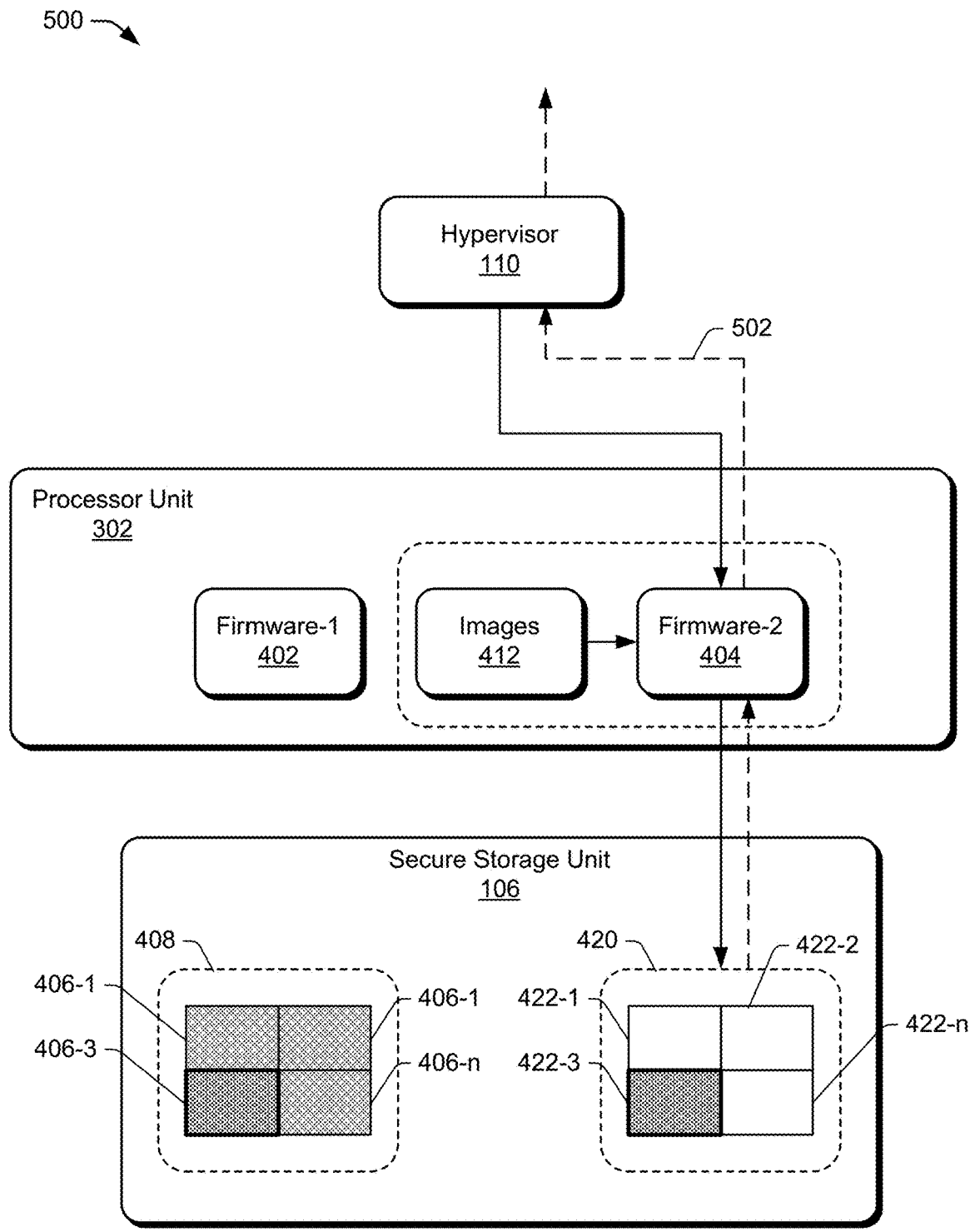
Figure 6:
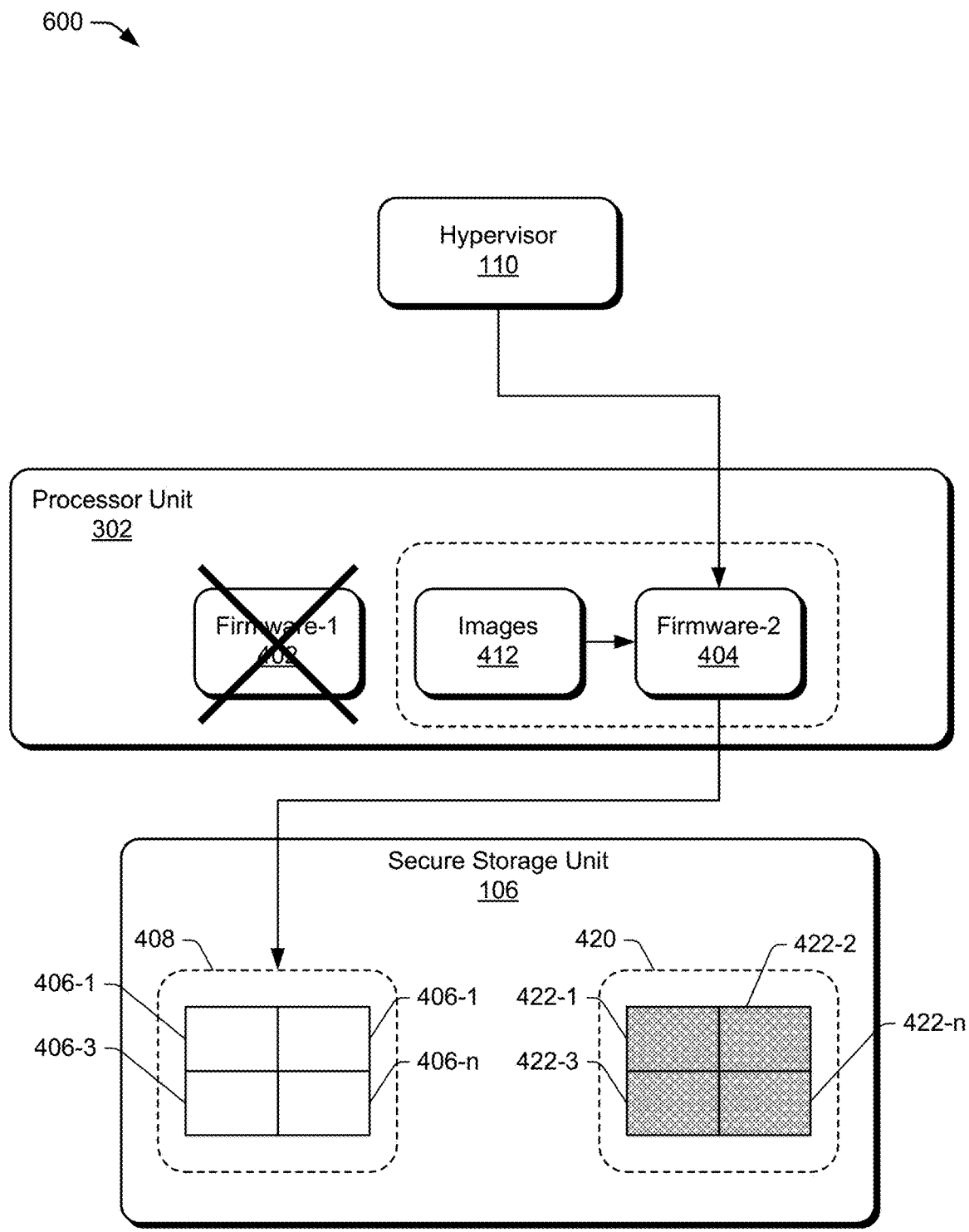

FIGS. 4 to 6 illustrate example implementations 400, 500, and 600 of face authentication embedding migration relative to a firmware update. Firstly, the user updates the user device 102 (from FIGS. 1 and 2), such as via over-the-air (OTA) transmission, to a system image that includes both the current version of firmware 206 (from FIG. 2), such as firmware-1 402, and the updated version of the firmware 208 (from FIG. 2), such as firmware-2 404. During a face-authentication attempt, the hypervisor 110 enters a secure session and loads the firmware-1 402 into the authentication system 108, which attempts to authenticate the user 114. The firmware-1 402 was used during enrollment to create a set of enrolled embeddings 406 (e.g., 406-1, 406-2, 406-3, . . . 406-n) corresponding to a first profile, such as profile-1 408 (also referred to as an enrollment profile). For example, the facial recognition module 112 sends a message 410, including a profile identity (ID), to the hypervisor 110 of the operating system 210 of the user device 102. The message 410 may also include images 412 (e.g., image data) captured by the NIR camera system 104. The profile ID may be cached by the facial recognition module 112, which manages user profiles on the user device 102. The facial recognition module 112 may associate the profile ID with an embedding version (e.g., version of embeddings generated based on a particular version of firmware or drift in biometrics of the user's face).

The hypervisor 110 passes the images 412 to the processor unit 302, which applies the firmware-1 402 to the images 412 to generate one or more embeddings 414. In at least one aspect, the processor unit 302 directly trains its output to be a compact 128-dimension embedding.

Embeddings 414 created during face-authentication attempts, such as this, are used for comparison to the enrolled embeddings 406, and are referred to herein as comparison embeddings 414. Because embeddings are vectors, vector distance can be used to calculate the similarity between two vectors. The comparison embeddings 414 are passed to the secure storage unit 106, which attempts to locate a match, or at least a substantial match that matches to within a threshold value of vector distance. The secure storage unit 106 returns an authentication status 416 (e.g., match or no match) back to the hypervisor 110 via the processor unit 302, and the hypervisor 110 passes the authentication status 416 to the user space for unlocking the user device 102. In the illustrated example, the secure storage unit 106 finds a matching enrolled embedding 406-3 that matches the comparison embedding 414. In addition, the secure storage unit 106 associates a last-authenticated user ID with a user ID of the profile-1 408 that was just authenticated.

At some point after updating the user device 102 to the system image that includes both the current and updated versions of the firmware, the authentication system 108 sends a request to the secure storage unit 106 to create a new profile, such as profile-2 420. This new profile is also referred to as a migration profile and corresponds to a new profile ID. In the illustrated example, the profile-2 420 has been created but it is currently empty (e.g., new embeddings 422 have not yet been generated or stored for this new profile-2 420). In addition, the secure storage unit 106 associates the profile-2 420 with the last-authenticated user ID in order to correlate the profile-2 420 with the same user as the profile-1 408.

Continuing with FIG. 5, after authenticating the user 114 and during the same secure session, the hypervisor 110 triggers the firmware-2 404 to run an enrollment update with the same image data (e.g., images 412) that was collected during the authentication attempt. For example, the hypervisor 110 can transmit a signal or message to the processor unit 302 to use the firmware-2 404 to generate one or more new embeddings 422 based on the images 412. Because of differences in the updated firmware-2 404, some of these new embeddings 422 may not be compatible with the current firmware-1 402. The new embeddings 422 are stored in a separate location in the secure storage unit 106 from the set of enrolled embeddings 406. For example, in FIG. 5, the enrolled embedding 406-3 was identified as a match to the comparison embedding 414 produced by the firmware-1 402 using the images 412. Then, when the firmware-2 404 is run on the images 412, the resulting new embedding is stored as embedding 422-3 in the profile-2 420. This new embedding 422-3 may be referred to as a migration embedding. The secure storage unit 106 returns a status 502 to the hypervisor 110 indicating that the new embedding 422-3 has been enrolled in the profile-2 420. The status 502 also indicates whether the new enrollments are full, such that the profile-2 420 is ready (e.g., sufficiently complete) for use in authenticating the user 114. With only a small number (e.g., 1 to 10) of new embeddings, the profile-2 420 may not be usable to authenticate the user 114 with a high confidence level. Therefore, more of the new embeddings 422 are likely required in order to fill in the profile-2 420.

After the migration embedding is stored in the profile-2 420, the secure storage unit 106 resets the last-authenticated user ID. Then, the secure session ends, e.g., the hypervisor 110 exits the secure session.

To collect additional new embeddings 422, this process repeats over a period of time, such as throughout a week, or for a quantity of times that satisfies a time threshold (e.g., fifty times), in response to a series of successive face-authentication attempts. During these subsequent successful face-authentication attempts, the user 114 is authenticated against the set of enrolled embeddings 406 corresponding to the profile-1 408, and additional new embeddings (e.g., embeddings 422-1, 422-2, . . . 422-*n*) are generated using the updated firmware, firmware-2 404. However, a new embedding is not necessarily stored as part of the profile-2 420 during each and every face-authentication attempt. For instance, if the secure storage unit 106 determines that the new embedding is substantially the same as another new embedding already stored in the migration region, then the new embedding is determined to be duplicative and is not saved.

When a sufficient amount or number of new embeddings 422 are generated and stored in the profile-2 420, then the secure storage unit 106 returns the status 502 indicating that the profile-2 420 is sufficiently complete (substantially all (e.g., ninety-five percent) embeddings for profile-2 420 are filled). Also, the secure storage unit 106 determines whether the profile-2 420 could have been used to authenticate the user during this most-recent authentication attempt. If not, then this determination is repeated during a next face-authentication attempt after generating an additional new embedding 422 that may replace a previously stored embedding 422 to improve the profile-2 420.

If, however, the user 114 could have been authenticated against the profile-2 420, then, continuing with FIG. 6, the profile-2 420 is saved as the enrollment profile to be used in subsequent face-authentication attempts. In addition, the authentication system 108 clears the profile-1 408 by deleting the set of enrolled embeddings 406. During subsequent successful face-authentication attempts, the authentication system 108 no longer uses the firmware-1 402 and instead only relies on the firmware-2 404 to authenticate the user 114. In some aspects, the firmware-1 402 may be deleted.

The original enrollment process attempts to fill out the embedding space of a profile by capturing embeddings from multiple angles. The migration embeddings (e.g., new embeddings 422), however, may not be captured from each angle because the authentication system 108 does not prompt the user 114 to capture images 412 from different poses. This does not mean that the migration cannot cover as large of an embedding space as the original enrollment. Rather, in contrast to the original enrollment, which uses a short window of time (e.g., one minute, 30 seconds) to capture multiple different angles of the user's face, the migration enrollment is not limited to such a short time frame but can capture embeddings over the course of several days. Ambient lighting conditions may vary from one authentication attempt to another on different days or different hours of the day. Because embeddings are captured in varying conditions, they are likely to cover a much larger embedding space than the original enrollment and also be much more indicative of the user's actual behavior.

Over the course of the migration (e.g., generating and storing new embeddings according to the updated firmware-2 404 in the background during multiple different face-authentication attempts that use the current firmware-1 402), the authentication system 108 monitors the new embeddings to avoid duplicate data. For example, to avoid unnecessary duplication of the embeddings, the authentication system 108 determines which embeddings to store based on a distance between different embedding values in comparison to a distance threshold. This provides embeddings that are sufficiently different from one another to enable the user 114 to unlock the user device 102 in a variety of, or regardless of, ambient lighting conditions or the orientation of the user device 102 relative to the user's face.

These techniques provide a simple migration scheme for migrating various profiles across various combinations of firmware. Also, the firmware can remain relatively fixed in size across updates. Further, these techniques require no additional latency cost on the critical path for validation of the user profile ID.

Figure 7:
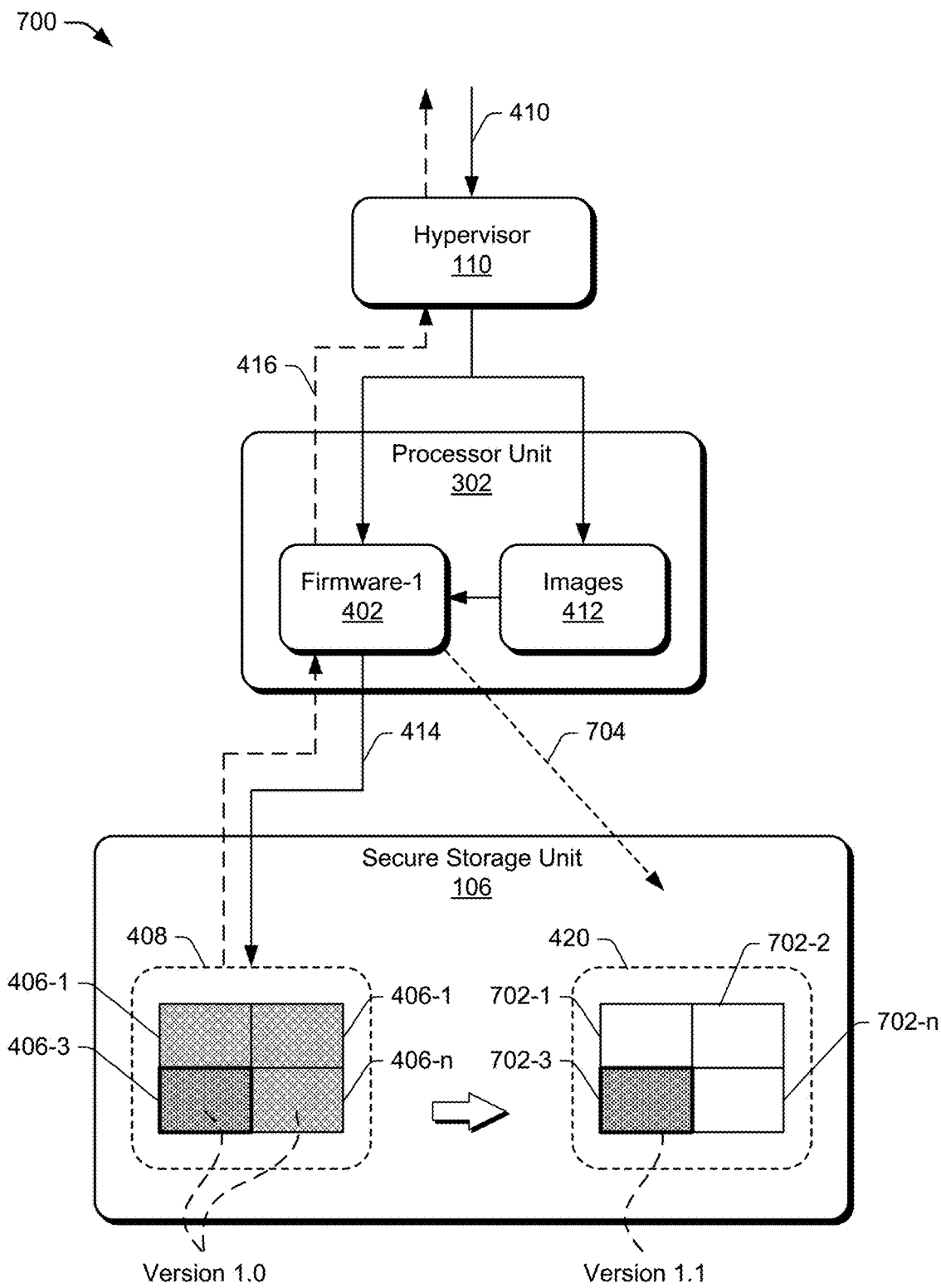
FIGS. 7 and 8 illustrate an example implementation of face authentication embedding drift-compensation.
Figure 8:
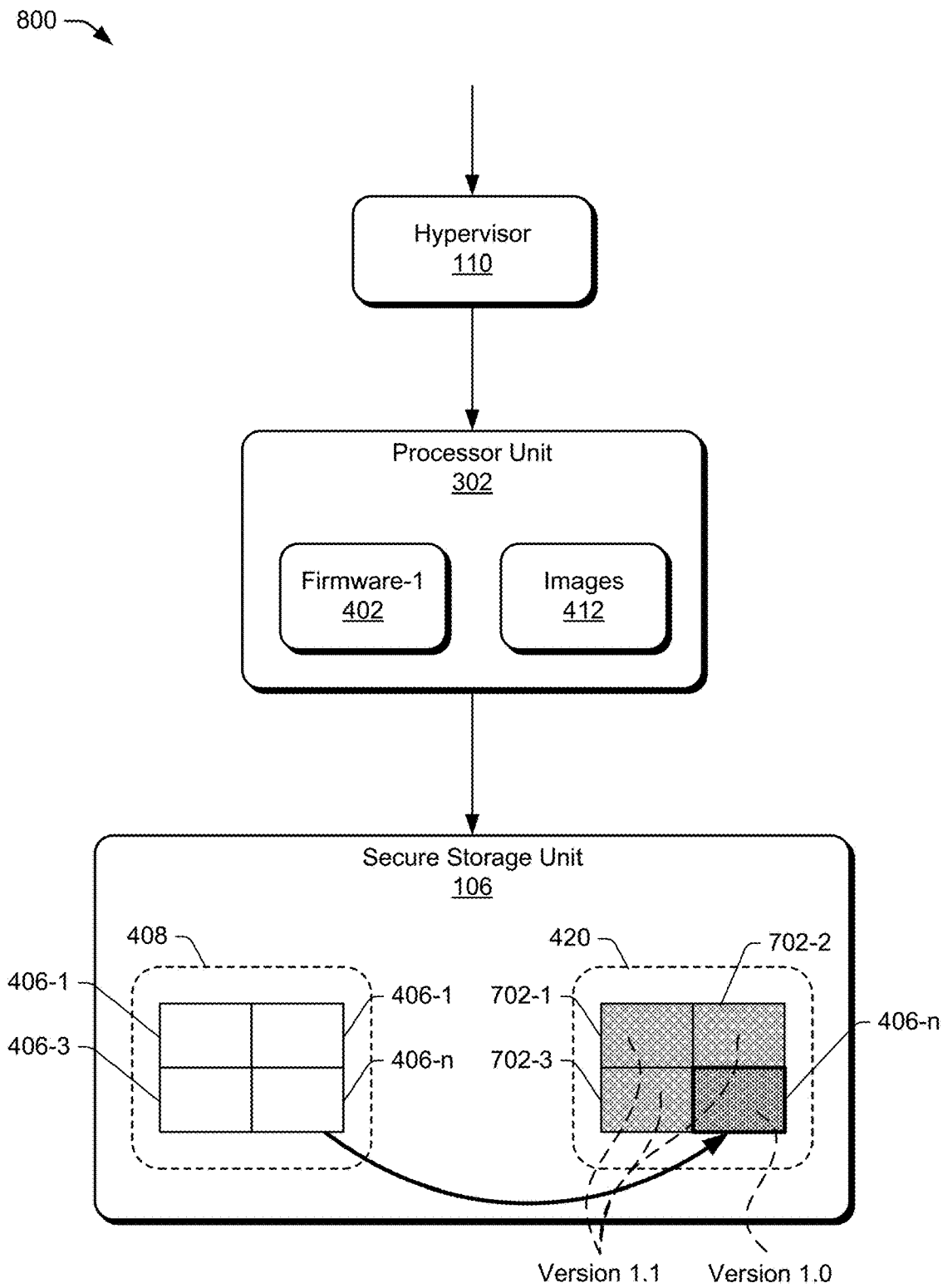

FIGS. 7 and 8 illustrate example implementations 700 and 800 of face authentication embedding migration for drift-compensation to correct biometric drift. As mentioned above, the unlock success rate may decrease over time due to gradual changes to the user's face that occur over time (e.g., beard growth, aging, new glasses, etc.) because the embeddings generated during face-authentication attempts may drift away from the stored embeddings that were created at enrollment. The example implementations 700 and 800, described with respect to FIGS. 7 and 8, illustrate a way to seamlessly generate a new, drifted profile based on gradual changes to the user's face, without requiring the user 114 to re-enroll in a setup process for face authentication.

In the example implementation 700, the hypervisor 110 uses the firmware-1 402 in the processor unit 302 to authenticate the user 114 in a manner similar to that described with respect to FIG. 6. The hypervisor 110 receives, from the facial recognition module 112, the message 410, which includes the profile ID (e.g., profile-1 408) for the face-authentication attempt and an optional migration profile ID (e.g., profile-2 420). The hypervisor 110 triggers the processor unit 302 to apply the firmware-1 402 to the images 412 to generate comparison embeddings 414. The comparison embeddings 414 are passed to the secure storage unit 106 to locate a matching enrolled embedding 406 corresponding to the profile-1 408. The processor unit 302 returns an authentication status 416 to the hypervisor 110 via the processor unit 302 to indicate authentication success or failure. The hypervisor 110 then returns the authentication status 416 to the user space. If the authentication is a success, the facial recognition module 112 can trigger a new profile (e.g., profile-2 420) to open for migration by tying the profiles (e.g., profile-1 408 and profile-2 420) together with the same user ID.

If the comparison embedding 414 passes validation but is greater than a threshold distance from the matching enrolled embedding 406, then the comparison embedding 414 is stored in the migration profile as a drifted embedding 702. In the illustrated example, the comparison embedding 414 substantially matches the enrolled embedding 406-3 sufficient for authentication. The "match," however, may not be identical. Although the comparison embedding 414 is sufficiently similar to the enrolled embedding 406-3 to be considered a match for authentication, it is also sufficiently different than the enrolled embedding 406-3 to be considered "drifted" from the biometrics of the user at the time of enrollment. A range of distance values may be used to determine if the comparison embedding 414 is drifted, such as by using a range bounded by a lower threshold distance and a higher threshold distance. In aspects, the higher threshold distance may indicate a maximum difference that is acceptable for the embeddings to be considered a match. The lower threshold distance may indicate a minimum difference in the embedding values that is acceptable for the comparison embedding 414 to be considered not only a match but also drifted from the enrollment embedding. If the comparison embedding 414 falls within this range (e.g., between the lower threshold distance and the higher threshold distance), then it is migrated to the new, migration profile and assigned a new version number. The threshold distance may also be referred to as a threshold difference due to its value representing a difference between two vectors (e.g., embeddings). In the illustrated example, the comparison embedding 414 is a drifted version of the enrolled embedding 406-3, version 1.0, and is thus stored in the migration profile-2 420 as embedding 702-3, version 1.1.

Continuing with implementation 800 in FIG. 8, additional drifted embeddings, such as drifted embeddings 702-1 and 702-2, are collected over time and stored in the migration region corresponding to the profile-2 420. In this way, the profile-2 420 is slowly built over a period of time, such as one week, two weeks, one month, etc., to account for gradual changes to the user's face. After a number of the drifted embeddings 702 are stored in the profile-2 420, the user device 102 may trigger a merge of the embedding regions. For example, the profile-1 408 may be merged with the profile-2 420 based on a matching user ID that corresponds to both of the profiles. In the merge, if the profile-2 420 includes any empty embedding spaces, the empty embedding spaces can be filled with corresponding enrolled embeddings by merging corresponding embeddings from the profile-1 408. For example, the enrolled embedding 406-n, version 1.0 is stored in a corresponding location in the profile-2 420. The profile-1 408 is removed by deleting the enrolled embeddings 406. Further, the profile-2 420 is then used for user-authentication in successive face-authentication attempts.

One challenge of embedding migration is that a poor migration from a firmware update risks increasing false recognition rate. To avoid increasing the false recognition rate of the face authentication, an authentication token can be used to initiate an embedding migration rather than, or in addition to, identification of biometric drift in the comparison embeddings 414. Returning to FIG. 7, in an example implementation, the message 410 received by the hypervisor 110, from the facial recognition module 112, includes an enroll migration command along with the profile ID of the enrolled embeddings (e.g., profile-1 408), the profile ID of the migration region (e.g., profile-2 420), and an authentication token. The processor unit 302 generates an embedding to be enrolled based on the firmware-1 402 and the images 412. The processor unit 302 sends information 704 to the secure storage unit 106. The information 704 includes the profile ID of the enrolled embeddings, the profile ID of the migration region, the authentication token, and an embedding version. The secure storage unit 106 compares a user ID of the authentication token to a user ID of the enrolled embeddings 406 and then locks the migration profile (e.g., profile-2 420) to that user ID.

The secure storage unit 106 selects an embedding to be replaced. In the illustrated example, the secure storage unit 106 selects the enrolled embedding 406-3 for replacement. Then, the secure storage unit 106 stores the new embedding (e.g., the comparison embedding 414) in the migration region as embedding 702-3, according to a new embedding version (e.g., version 1.1). Additional new embeddings 702 are added over time, during a series of subsequent face-authentication attempts. As above, based on a number of new embeddings 702 stored in the migration region, the user device 102 can trigger a merging of the embedding regions. As a result, the specified profile-1 408 is merged with the profile-2 420, which corresponds to a user ID that matches the user ID of the profile-1 408. Then, the profile-1 408 is erased by deleting the set of enrolled embeddings 406.

Example Methods

Figure 9:
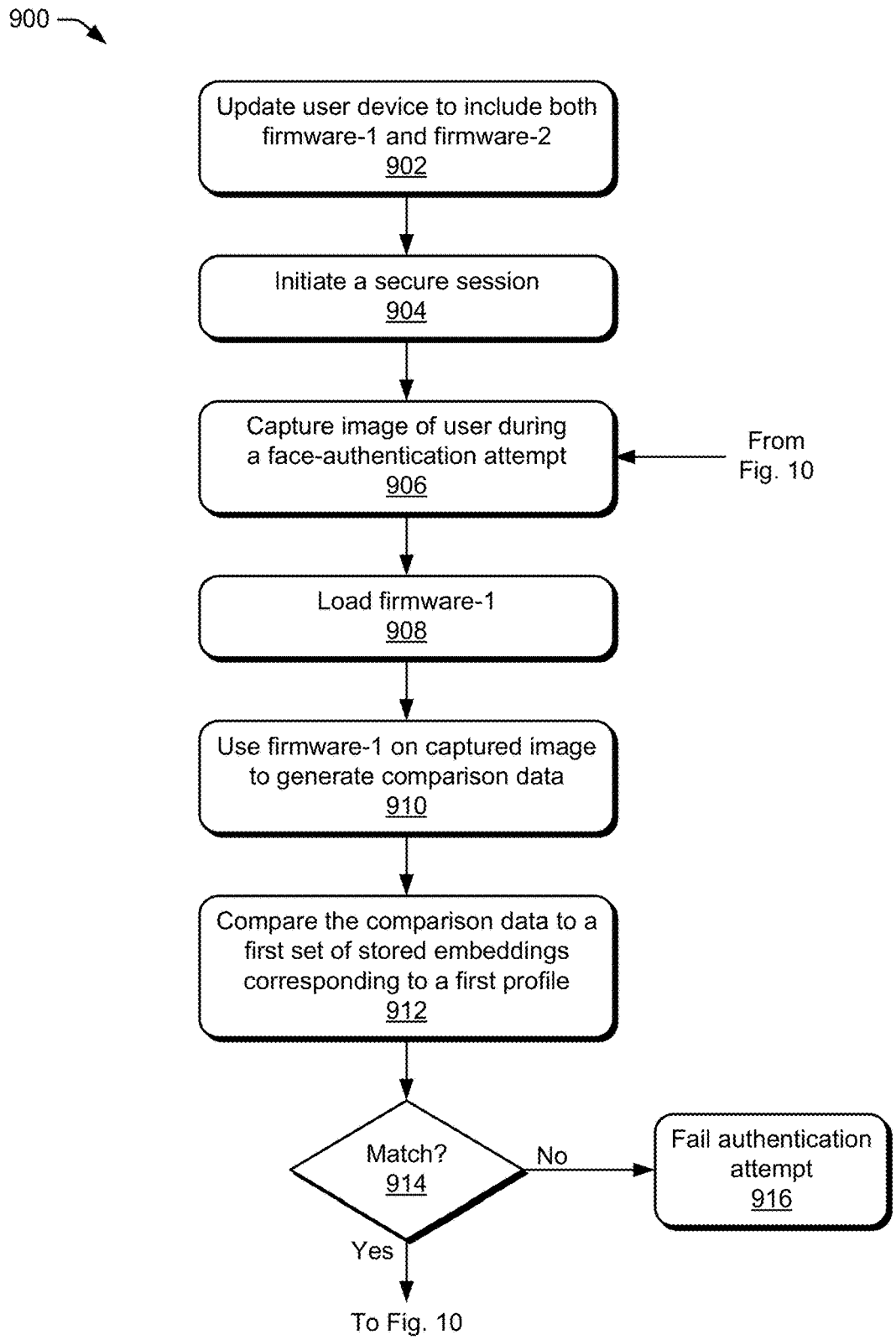
FIGS. 9 and 10 depict a method of migrating embeddings for face authentication.

FIG. 9 depicts an example method 900 for migrating face authentication profile data, such as embeddings. The method 900 can be performed by the user device 102, which uses the authentication system 108 (including the processor unit 302) to perform a face-authentication attempt using image data, obtained by the NIR camera system 104, and a set of embeddings stored in the secure storage unit 106.

The method 900 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-8, reference to which is made for example only. The techniques are not limited to performance by one entity or multiple entities operating on one device.

At 902, a user device is updated to include both a first version of firmware and a second version of the firmware. The second version of the firmware (e.g., the firmware-2 404) is an updated version of the first version (e.g., the firmware-1 402). In aspects, the user device 102 is updated to a system image that includes both the first and second versions of the firmware, such that both versions of the firmware can be loaded during the same secure session.

At 904, a secure session is initiated. For example, the hypervisor 110 enters a secure session for passing information and data between the NIR camera system 104 and the authentication system 108.

At 906, an image of a user is captured during a face-authentication attempt. In an example, the facial recognition module 112 initiates the NIR camera system 104 to operate in a secure mode and capture one or more images 412 of the user's face using the dot projector 304, the flood illuminator 306, and the NIR camera(s) 308. Resulting image data (e.g., the images 412) is passed to the hypervisor 110 of the operating system 210 of the user device 102 for face authentication and the hypervisor 110 passes the image data to the processor unit 302.

At 908, the first version of the firmware is loaded. For example, the hypervisor 110 triggers the processor unit 302 to load the first version of the firmware. The hypervisor 110 can specify the first version of the firmware based on a profile ID received from the facial recognition module 112.

At 910, the first version of the firmware is used to generate comparison data. For example, the hypervisor 110 uses the first version (e.g., the firmware-1 402) of the firmware that is loaded in the processor unit 302 to generate the comparison data, such as a comparison embedding 414, from the images 412. This comparison embedding 414 is usable for comparison to a set of enrolled embeddings 406 that are stored in association with the profile ID.

At 912, the secure storage unit compares the comparison data to a set of enrolled embeddings corresponding to a first profile. For example, the secure storage unit 106, operating a secure mode, receives the comparison embedding 414 and the profile ID and uses the profile ID to identify the set of enrolled embeddings 406. Then, the secure storage unit 106 attempts to locate one or more embeddings in the set of enrolled embeddings 406 that substantially match the comparison embedding 414.

At 914, the secure storage unit determines if the comparison data (e.g., comparison embedding 414) substantially matches one or more of the enrolled embeddings. The secure storage unit 106 can determine that an embedding from the set of enrolled embeddings 406 substantially matches the comparison embedding 414 by a measurable amount (e.g., vector distance) that is within a threshold distance. If there is no match, then at 916, the secure storage unit returns a fail status to the hypervisor 110. To maintain security, information that leaves the secure storage unit may be limited to an authentication status, which indicates a match (e.g., "True") or no match (e.g., "false"), referring to whether the comparison embedding 414 substantially matches an enrolled embedding 406 in the enrollment profile (e.g., profile-1 408).

Figure 10:
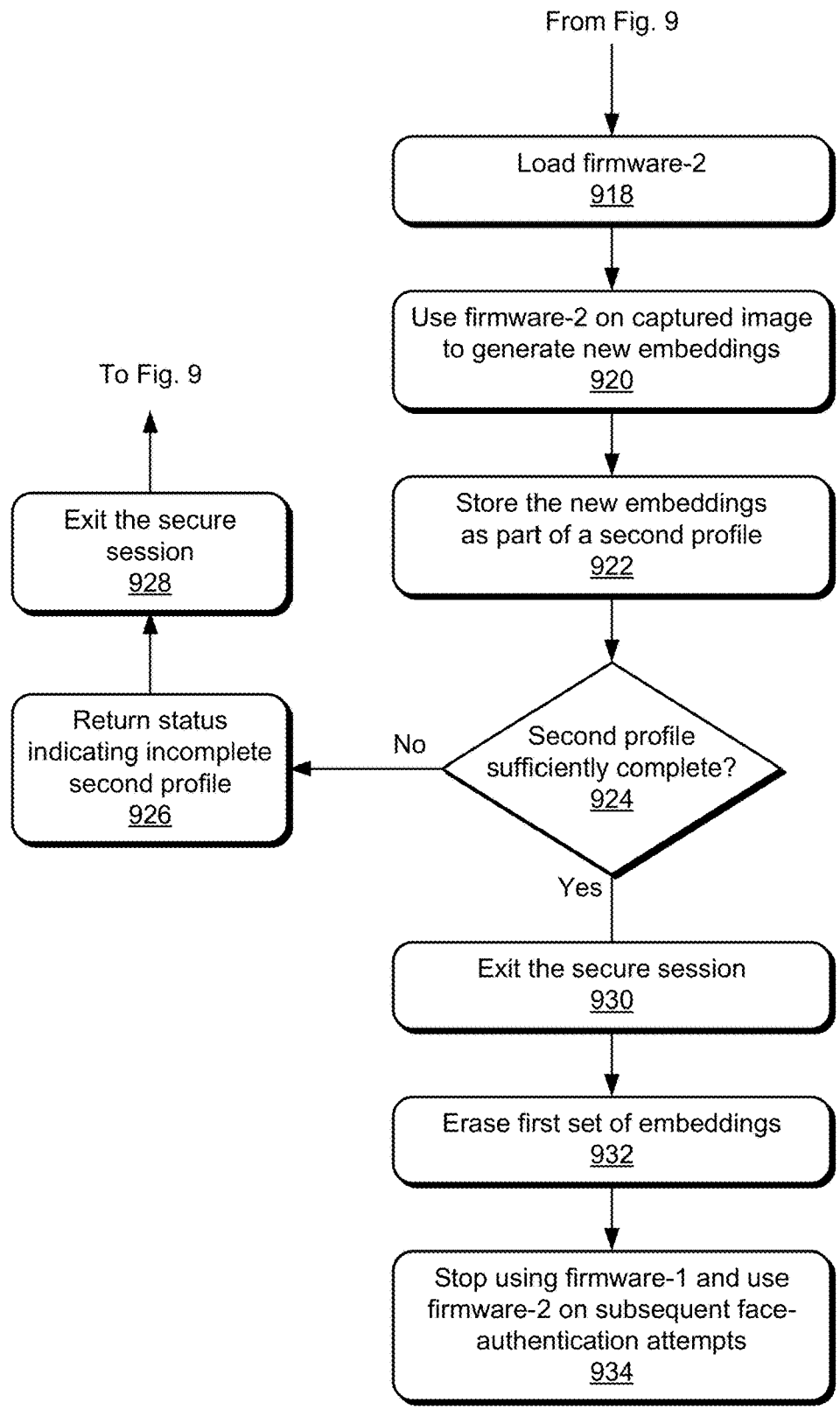

If, however, the secure storage unit identifies a matching embedding in the set of enrolled embeddings that substantially matches the comparison data, then the process proceeds to 918 in FIG. 10. At 918, based on a match being identified, the processor unit loads the second version of the firmware. For instance, after passing the authentication status 416 to the hypervisor 110 to indicate validation of the image data, the processor unit 302 loads the firmware-2 404 to initiate a migration workflow.

At 920, the processor unit uses the second version of the firmware to generate new embeddings from the images. Because the image data was authenticated using the first version of the firmware, the same image data is now used by the second version of the firmware for migration purposes. Accordingly, the processor unit 302 generates a new embedding using the firmware-2 404 on the image data (e.g., images 412).

At 922, the secure storage unit stores the new embeddings as part of a second profile. For example, the secure storage unit 106 stores the new embedding in a migration region, which is a separate location from the enrollment region (e.g., the set of enrolled embeddings), and associates the new embedding with a migration profile ID, such as profile-2 420. The new embedding can now be considered a migration embedding that is associated with the migration profile.

At 924, the secure storage unit determines if the second profile is sufficiently complete to be usable to authenticate the user with a high level of confidence. In aspects, the secure storage unit 106 can check the number of new embeddings stored in the migration region associated with the profile-2 420 to determine a level of completeness of the profile-2 420. Additionally, each time the process is repeated, the secure storage unit 106 can determine if the user could have been reliably authenticated using the new embeddings 422 in the profile-2 420. If the second profile is not sufficiently complete (e.g., "NO"), then at 926 the secure storage unit returns a status, to the hypervisor via the processor unit, indicating that the second profile is not ready to be used for face authentication.

At 928, the hypervisor exits the secure session. During a subsequent face-authentication attempt, the method returns to 904 of FIG. 9 to repeat the operations of 904 to 924. If the secure storage unit determines that the second profile is sufficiently complete, such that it is ready to be used to reliably authenticate the user (e.g., "YES"), then the method proceeds to 930.

At 930, the hypervisor exits the secure session. At 932, the set of enrolled embeddings is erased. Deleting the set of enrolled embeddings frees up limited storage space in the secure storage unit 106 and prevents the secure storage unit 106 from using outdated embeddings.

At 934, the kernel stops using the first version of the firmware and only uses the second version of the firmware on succeeding face-authentication attempts, until the user device is updated again. For example, the facial recognition module 112 manages the profile IDs and specifies the profile-2 420 for subsequent face-authentication attempts, treating the profile-2 420 and its corresponding migration embeddings now as the enrollment profile and enrollment embeddings.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Example Computing System

Figure 11:
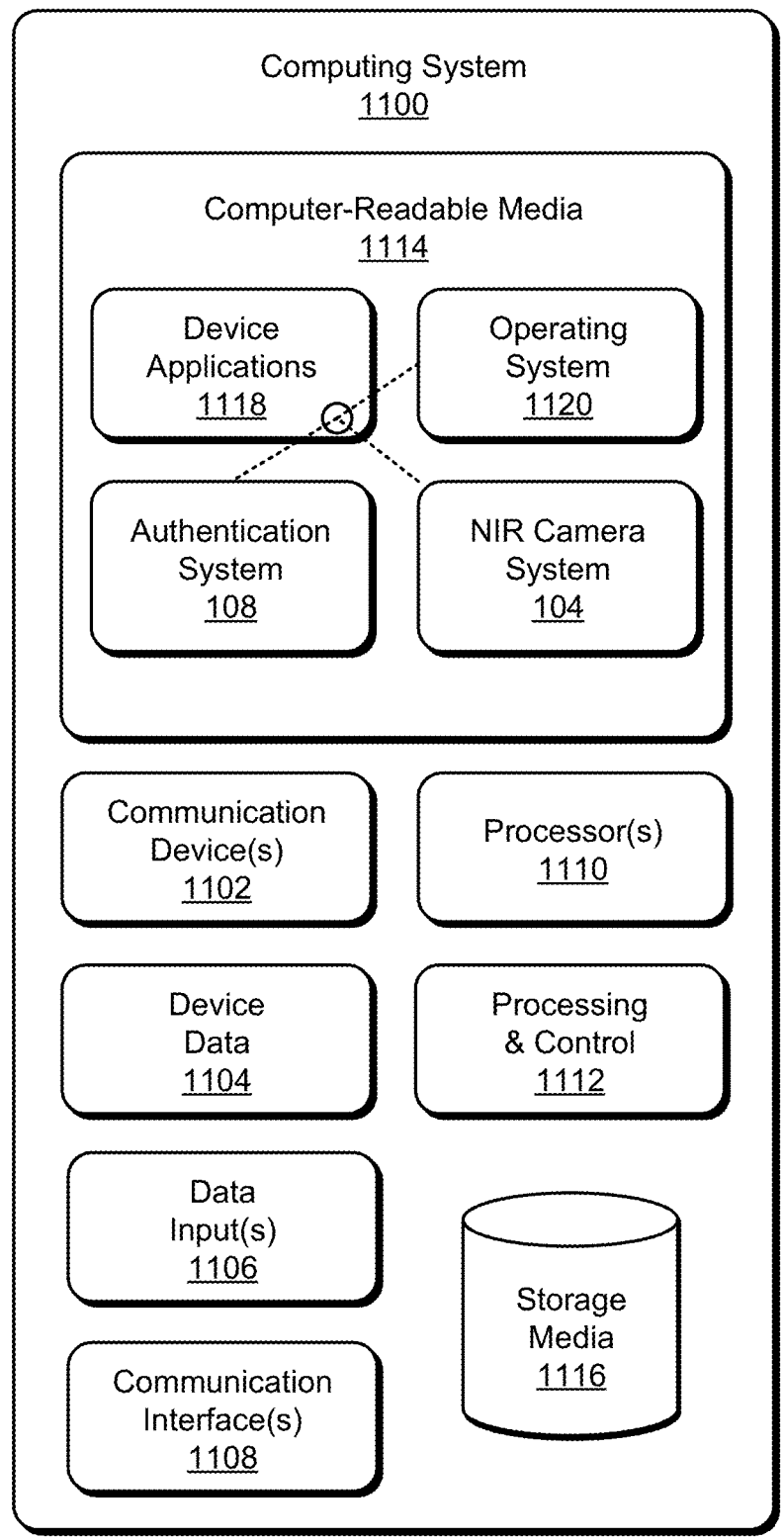
FIG. 11 illustrates an example computing system that can be implemented as any type of client, server, and/or electronic device as described with reference to FIGS. 1-10 to implement, or in which techniques may be implemented that enable, face authentication embedding migration and drift-compensation.

FIG. 11 illustrates various components of an example computing system 1100 that can be implemented as any type of client, server, and/or electronic device as described with reference to the previous FIGS. 1-10 to implement face authentication embedding migration and drift-compensation.

The computing system 1100 includes communication devices 1102 that enable wired and/or wireless communication of device data 1104 (e.g., radar data, authentication data, reference data, received data, data that is being received, data scheduled for broadcast, and data packets of the data). The device data 1104 or other device content can include configuration settings of the device, media content stored on the device, and/or information associated with a user of the device (e.g., an identity of a person within a radar field or customized air gesture data). Media content stored on the computing system 1100 can include any type of radar, biometric, audio, video, and/or image data. The computing system 1100 includes one or more data inputs 1106 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 1100 also includes communication interfaces 1108, which can be implemented as any one or more of a serial and/or a parallel interface, a wireless interface, any type of network interface, a modem, and as any other type of communication interface. The communication interfaces 1108 provide a connection and/or communication links between the computing system 1100 and a communication network by which other electronic, computing, and communication devices communicate data with the computing system 1100.

The computing system 1100 includes one or more processors 1110 (e.g., any of microprocessors, controllers, or other controllers) that can process various computer-executable instructions to control the operation of the computing system 1100 and to enable techniques for, or in which can be implemented, face authentication embedding migration and drift-compensation. Alternatively or additionally, the computing system 1100 can be implemented with any one or combination of hardware, firmware, or fixed logic circuitry that is implemented in connection with processing and control circuits, which are generally identified at 1112. Although not shown, the computing system 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1100 also includes computer-readable media 1114, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1100 can also include a mass storage media device (storage media) 1116.

The computer-readable media 1114 provides data storage mechanisms to store the device data 1104, as well as various device applications 1118 and any other types of information and/or data related to operational aspects of the computing system 1100. For example, an operating system 1120 can be maintained as a computer application with the computer-readable media 1114 and executed on the processors 1110. The device applications 1118 may include a device manager, such as any form of a control application, software application, signal-processing and control modules, code that is native to a particular device, an abstraction module, an air gesture recognition module, and other modules. The device applications 1118 may also include system components, engines, modules, or managers to implement face authentication embeddings migration. The computing system 1100 may also include, or have access to, one or more machine learning systems.

Several examples are described below.

Example 1. A method of migrating face authentication profile data in a user device performed by the user device, the method comprising: updating the user device to include both a current version of firmware and an updated version of the firmware; subsequent to the updating, receiving an indication of a face-authentication attempt and image data associated with a user's face; loading both the current version of the firmware and the updated version of the firmware in a same secure session; executing the current version of the firmware to generate comparison data using the image data; authenticating the user to unlock the user device based on the comparison data substantially matching a first profile, the first profile based on a set of enrolled embeddings that were previously generated using the current version of the firmware on previously-captured image data of the user's face; responsive to authenticating the user to unlock the user device, generating one or more new embeddings by executing the updated version of the firmware and the captured image data; and storing the one or more new embeddings at a separate location from the set of enrolled embeddings, the one or more new embeddings stored as part of a second profile for the user.

Example 2. The method of example 1, further comprising generating additional new embeddings by repeatedly executing the updated version of the firmware over a series of subsequent successful face-authentication attempts until a sufficient amount of the new embeddings are generated and stored to enable the second profile to be usable to authenticate the user.

Example 3. The method of any preceding example, wherein each embedding comprises an n-dimensional vector representing one or more features of the user's face.

Example 4. The method of any preceding example, further comprising: determining that the second profile is ready for use in subsequently authenticating the user to unlock the user device; and executing the updated version of the firmware to authenticate the user against the second profile.

Example 5. The method of example 4, further comprising, in response to the determining, deleting the first profile and the set of enrolled embeddings.

Example 6. The method of any preceding example, wherein the second profile is built according to the updated version of the firmware without requiring the user to re-enroll in a setup process for face authentication using the updated version of the firmware.

Example 7. The method of any preceding example, further comprising determining which of the one or more new embeddings to store as part of the second profile based on compatibility and an amount of difference between the one or more new embeddings and corresponding embeddings in the set of enrolled embeddings.

Example 8. The method of any preceding example, wherein: the current version of the firmware includes a first machine-learned model trained to generate the set of enrolled embeddings; and the one or more new embeddings are generated by a second machine-learned model of the updated version of the firmware.

Example 9. The method of example 8, wherein at least one of the one or more new embeddings is incompatible with the first machine-learned model of the current version of the firmware.

Example 10. The method of any preceding example, wherein: the image data is captured by a near-infrared camera system of the user device in a secure mode.

Example 11. The method of any preceding example, wherein: the first profile is stored in a secure storage unit; and the storing of the one or more new embeddings includes storing the one or more new embeddings in the secure storage unit.

Example 12. A user device capable of migration of face authentication embeddings, the user device comprising a hypervisor, a processor unit, and a secure storage unit collectively configured to perform the method of any one of the preceding examples.

Example 13. A method of migrating face authentication profile data for drift-compensation in a user device, the method comprising: receiving, by a hypervisor of the user device, a profile identity and image data associated with a face-authentication attempt of a user's face; specifying, by the hypervisor, the profile identity and an optional migration profile; generating, by a processor unit, a new embedding using the image data; authenticating the user to unlock the user device based on the new embedding substantially matching an enrolled embedding from a set of enrolled embeddings corresponding to the profile identity; determining that the new embedding differs from the enrolled embedding by an amount that is within a range bounded by first and second threshold differences, the first threshold difference representing a maximum difference that is acceptable to be considered a match, the second threshold difference being less than the first threshold difference and representing a minimum difference that is acceptable to be considered drift; and based on the determining, storing the new embedding as a drifted embedding in a migration region corresponding to the migration profile.

Example 14. The method of example 13, wherein the drifted embedding is stored as a replacement to the substantially-matching enrolled embedding.

Example 15. The method of any one of example 13 or example 14, further comprising: storing additional drifted embeddings responsive to a series of successful face-authentication attempts until the profile identity is triggered to merge with the migration profile.

Example 16. The method of example 15, further comprising triggering a secure storage unit to merge the profile identity with the migration profile to cause empty embedding spaces in the migration profile to be filled with corresponding enrolled embeddings from the set of enrolled embeddings of the profile identity.

Example 17. The method of example 16, wherein based on the profile identity being merged into the migration profile, deleting the set of enrolled embeddings of the profile identity and using the migration profile as an enrollment profile for successive face-authentication attempts.

Example 18. The method of any one of examples 13 to 17, wherein the image data is captured by a near-infrared camera system in a secure mode.

Example 19. The method of any one of examples 13 to 18, wherein the authenticating, the determining, and the storing are performed by a secure storage unit.

Example 20. A user device capable of migration of face authentication embeddings, the user device comprising a hypervisor, a processor unit, and a secure storage unit collectively configured to perform the method of any one of examples 13 to 19.

CONCLUSION

Although implementations of techniques for, and apparatuses enabling face authentication embeddings migration and drift-compensation have been described in language specific to features and/or methods, it is to be understood that the subject of the appended claims is not necessarily limited to the specific features or methods described. Rather, the specific features and methods are disclosed as example implementations of face authentication embedding migration and drift-compensation.

What is claimed is:

1. A method of migrating face authentication profile data in a user device, the method comprising:
   updating the user device to include both a current version of firmware and an updated version of the firmware;
   subsequent to the updating, receiving an indication of a face-authentication attempt and image data associated with a user's face, the image data captured during the face-authentication attempt;
   entering a secure session for passing data between a camera system and an authentication system;
   during the secure session:
      loading both the current version of the firmware and the updated version of the firmware into the authentication system;
      executing the current version of the firmware to generate comparison data using the image data captured during the face-authentication attempt;
      authenticating the user to unlock the user device based on the comparison data substantially matching a first profile, the first profile based on a set of enrolled embeddings that were previously generated using the current version of the firmware on previously-captured image data of the user's face;
      responsive to authenticating the user to unlock the user device, generating one or more new embeddings by executing the updated version of the firmware using the image data captured during the face-authentication attempt;
      storing the one or more new embeddings at a separate location from the set of enrolled embeddings, the one or more new embeddings stored as part of a second profile for the user; and
      after storing the one or more new embeddings, exiting the secure session.

2. The method of claim 1, further comprising generating additional new embeddings by repeatedly executing the updated version of the firmware over a series of subsequent successful face-authentication attempts until a sufficient amount of the new embeddings are generated and stored to enable the second profile to be usable to authenticate the user.

3. The method of claim 1, wherein each embedding comprises an n-dimensional vector representing one or more features of the user's face.

4. The method of claim 1, further comprising:
   determining that the second profile is ready for use in subsequently authenticating the user to unlock the user device; and
   executing the updated version of the firmware to authenticate the user against the second profile.

5. The method of claim 4, further comprising, in response to the determining, deleting the first profile and the set of enrolled embeddings.

6. The method of claim 1, wherein the second profile is built according to the updated version of the firmware without requiring the user to re-enroll in a setup process for face authentication using the updated version of the firmware.

7. The method of claim 1, further comprising determining which of the one or more new embeddings to store as part of the second profile based on compatibility and an amount of difference between the one or more new embeddings and corresponding embeddings in the set of enrolled embeddings.

8. The method of claim 1, wherein:
   the current version of the firmware includes a first machine-learned model trained to generate the set of enrolled embeddings; and
   the one or more new embeddings are generated by a second machine-learned model of the updated version of the firmware.

9. The method of claim 8, wherein at least one of the one or more new embeddings is incompatible with the first machine-learned model of the current version of the firmware.

10. A user device comprising:
    an authentication system configured to implement a facial recognition module to authenticate a user to unlock the user device;
    a camera system configured to capture image data associated with a face of the user during a face-authentication attempt;
    a hypervisor configured to, during the face-authentication attempt, enter a secure session for passing data between the camera system and the authentication system;
    a processor unit configured to:
       update the user device to include both a current version of firmware and an updated version of the firmware;

subsequent to the updating, receive an indication of the face-authentication attempt and the image data associated with the face of the user;

responsive to receiving the indication of the face-authentication attempt and during the secure session, execute the current version of the firmware to generate comparison data using the image data captured during the face-authentication attempt; and during the secure session and responsive to the user being authenticated by the authentication system based on the comparison data substantially matching a first profile, generate one or more new embeddings by executing the updated version of the firmware using the image data captured during the face-authentication attempt, the first profile based on a set of enrolled embeddings that were previously generated using the current version of the firmware on previously-captured image data of the face of the user; and a secure storage unit configured to, during the secure session, store the one or more new embeddings at a separate location from the set of enrolled embeddings, the one or more new embeddings stored as part of a second profile for the user, the hypervisor configured to exit the secure session after the one or more new embeddings are stored.

11. The user device of claim 10, wherein the processor unit is configured to generate new embeddings by repeatedly executing the updated version of the firmware over a series of subsequent successful face-authentication attempts until a sufficient amount of the new embeddings are generated and stored to enable the second profile to be usable to authenticate the user.

12. The user device of claim 10, wherein each embedding comprises an n-dimensional vector representing one or more features of the face of the user.

13. The user device of claim 10, wherein:
the secure storage is configured to determine that the second profile is ready for use in subsequently authenticating the user to unlock the user device; and
the hypervisor is configured to, in response to the determination that the second profile is ready for use in subsequently authenticating the user to unlock the user device, trigger the processor unit to execute the updated version of the firmware to authenticate the user against the second profile.

14. The user device of claim 13, wherein the authentication system is configured to, in response to the determination that the second profile is ready for use in subsequently authenticating the user to unlock the user device, cause the secure storage unit to delete the first profile and the set of enrolled embeddings.

15. The user device of claim 10, wherein the second profile is built according to the updated version of the firmware without requiring the user to re-enroll in a setup process for face authentication using the updated version of the firmware.

16. The user device of claim 10, wherein the secure storage unit is configured to determine which of the one or more new embeddings to store as part of the second profile based on compatibility and an amount of difference between the one or more new embeddings and corresponding embeddings in the set of enrolled embeddings.

17. The user device of claim 10, wherein:
the current version of the firmware includes a first machine-learned model trained to generate the set of enrolled embeddings; and
the one or more new embeddings are generated by a second machine-learned model of the updated version of the firmware.

18. The user device of claim 17, wherein at least one of the one or more new embeddings is incompatible with the first machine-learned model of the current version of the firmware.

19. The user device of claim 10, further comprising a near-infrared camera system configured to capture the image data in a secure mode.

20. One or more non-transitory computer-readable storage media storing instructions that, responsive to executing by one or more processors, cause the one or more processors to implement operations including:
updating the user device to include both a current version of firmware and an updated version of the firmware;
subsequent to the updating, receiving an indication of a face-authentication attempt and image data associated with a user's face, the image data captured during the face-authentication attempt;
entering a secure session for passing data between a camera system and an authentication system;
during the secure session:
loading both the current version of the firmware and the updated version of the firmware into the authentication system;
executing the current version of the firmware to generate comparison data using the image data captured during the face-authentication attempt;
authenticating the user to unlock the user device based on the comparison data substantially matching a first profile, the first profile based on a set of enrolled embeddings that were previously generated using the current version of the firmware on previously-captured image data of the user's face;
responsive to authenticating the user to unlock the user device, generating one or more new embeddings by executing the updated version of the firmware using the image data captured during the face-authentication attempt;
storing the one or more new embeddings at a separate location from the set of enrolled embeddings, the one or more new embeddings stored as part of a second profile for the user; and
after storing the one or more new embeddings, exiting the secure session.

* * * * *